US008395490B2

(12) United States Patent
Yuda

(10) Patent No.: US 8,395,490 B2
(45) Date of Patent: Mar. 12, 2013

(54) BLIND SPOT DISPLAY APPARATUS

(75) Inventor: Masato Yuda, Osaka (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 12/864,555

(22) PCT Filed: Mar. 27, 2009

(86) PCT No.: PCT/JP2009/001392
§ 371 (c)(1),
(2), (4) Date: Jul. 26, 2010

(87) PCT Pub. No.: WO2009/119110
PCT Pub. Date: Oct. 1, 2009

(65) Prior Publication Data
US 2010/0315215 A1 Dec. 16, 2010

(30) Foreign Application Priority Data

Mar. 27, 2008 (JP) ................................ 2008-084536

(51) Int. Cl.
B60Q 1/00 (2006.01)
(52) U.S. Cl. ........ 340/436; 340/438; 340/903; 340/905; 340/995.17; 340/995.25; 382/148; 382/149; 382/176; 382/193
(58) Field of Classification Search .................. 340/436, 340/438, 903, 995.17, 995.25, 905; 382/148, 382/149, 176, 193
See application file for complete search history.

(56) References Cited

U.S. PATENT DOCUMENTS

| 6,947,611 | B2 * | 9/2005 | Kawakami et al. ............ 382/293 |
| 7,161,616 | B1 * | 1/2007 | Okamoto et al. .............. 348/148 |
| 2002/0163519 | A1 | 11/2002 | Kitsutaka |
| 2005/0122400 | A1 | 6/2005 | Kochi et al. |
| 2007/0003162 | A1 | 1/2007 | Miyoshi et al. |
| 2007/0139523 | A1 * | 6/2007 | Nishida et al. ................. 348/148 |

FOREIGN PATENT DOCUMENTS

| JP | 8-306000 | 11/1996 |
| JP | 2002-063596 | 2/2002 |
| JP | 2003-319383 | 11/2003 |
| JP | 2004-056486 | 2/2004 |

(Continued)

OTHER PUBLICATIONS

International Search Report issued May 12, 2009 in International (PCT) Application No. PCT/JP2009/001392.

(Continued)

Primary Examiner — Tai T Nguyen
(74) Attorney, Agent, or Firm — Wenderoth, Lind & Ponack LLP.

(57) ABSTRACT

A blind spot display apparatus presents a situation at a blind spot occurring at an intersection from a driver's viewpoint, in a method of presenting the situation to a driver. The blind spot display apparatus includes: an omni-directional image storage unit storing omni-directional images obtained at different positions; a blind spot model generating unit calculating a position of the object based on each image of the object (in the blind spot) included in the omni-directional images; an own-vehicle model generating unit calculating a position of a vehicle based on images of the vehicle included in the omni-directional images; an own-vehicle viewpoint coordinate transforming unit transforming the calculated position of the object into display coordinates relative to the calculated position of the vehicle; and a display unit that performs display.

21 Claims, 29 Drawing Sheets

FOREIGN PATENT DOCUMENTS

| | | |
|---|---|---|
| JP | 2005-094048 | 4/2005 |
| JP | 2005-167397 | 6/2005 |
| JP | 2005-250560 | 9/2005 |
| JP | 2007-037011 | 2/2007 |
| JP | 3972722 | 9/2007 |
| JP | 2007-316856 | 12/2007 |
| JP | 2008-041058 | 2/2008 |
| JP | 2008-046744 | 2/2008 |
| WO | 2005/088970 | 9/2005 |

OTHER PUBLICATIONS

H. Otsu et al., "Doro Kanshi Camera o Mochiita Kosaten ni Okeru Tanshukuho o Tekiyo shita Kukan Eizo no Seisei (Synthesis of Fore-shortened Air-View Video at an Intersection Using Road Surveillance Cameras)", IEICE Technical Report, vol. 107, No. 115, Jun. 2007, pp. 111-116.

H. Otsu et al., "Fukusu no Doro Kanshi Camera o Mochiita Kosaten Fukan Eizo no Seisei (Synthesis of Overhead View at an Intersection Using Multiple Surveillance Cameras)", Proceedings of the 2007 IEICE General Conference Joho System Mar. 2, 2007, p. 171.

H. Otsu et al., "Synthesis of Overhead View at an Intersection Using Multiple Surveillance Cameras", the $5^{th}$ ITS Symposium 2006, Dec. 2006 (with English translation).

* cited by examiner

BLIND SPOT DISPLAY APPARATUS

TECHNICAL FIELD

The present invention relates to an image processing apparatus with a technique that is a combination of a computer graphics technique and a technique using an image obtained from a camera, and in particular to an apparatus that displays, on a display, an image of a blind spot that is at an intersection and that cannot be seen from an own vehicle.

BACKGROUND ART

As one of the approaches of Intelligent Transport Systems (ITS) promoted by the Ministry of Land, Infrastructure, Transport and Tourism, services for drivers have been considered, such as alerting a driver currently driving a vehicle and providing alert support. In particular, the collision prevention support service will be an important approach to prevent accidents at an intersection where head-on accidents frequently occur. Currently, informing a driver of a situation at an intersection to be a blind spot for the driver using road sensors and image sensors are under review. Furthermore, the image sensors, such as a camera will be more and more downsized and inexpensive in the future. Although they are currently installed only along the express highways and main roads, in the future, it is expected that they will be installed along any road.

The conventional method of presenting a situation at a blind spot to a driver probably includes capturing images of a road to be a blind spot by an in-vehicle camera, distributing the captured video to rear vehicles, and displaying the video from the driver's point of view on the displays of the rear vehicles, based on the distributed video. For example, Patent Reference 1 discloses an apparatus.

The apparatus disclosed in Patent Reference 1 includes: an imaging unit that obtains an image in the traveling direction of an own vehicle; an own-vehicle image correcting unit that corrects the image obtained by the imaging unit in the traveling direction of the own vehicle to an image seen from a driver; a forward vehicle image receiving unit that receives, from a forward vehicle, the image obtained from the forward vehicle in the traveling direction; a distance calculating unit that calculates a distance to an imaging position of the image received from the forward vehicle image receiving unit; a forward vehicle image correcting unit that corrects the image received from the forward vehicle image receiving unit to the image seen from the driver, based on the distance to the forward vehicle that is calculated by the distance calculating unit; and an image superimposing unit that superimposes the image corrected by the forward vehicle image correcting unit on a portion corresponding to a blind spot for the forward vehicle in the image corrected by the own-vehicle image correcting unit to generate a superimposed display image in which the image of the forward vehicle is made transparent.

Furthermore, Non-patent Reference 2 discloses placing cameras at an intersection, performing two-dimensional projective transformation on images obtained from the cameras, and generating a virtual overhead view as if seen from above the intersection.

Patent Reference 1: Japanese Patent No. 3972722
Non-patent Reference 2: Synthesis of overhead view at an intersection using multiple surveillance cameras, University of Tsukuba, Dec. 6, 2006

However, since only the images in a direction of the driver's line of sight can be generated according to the method disclosed in Patent Reference 1, video of a blind spot caused by an intersection cannot be generated. Even when cameras are installed not inside vehicles but at an intersection as described in Patent Reference 1, a large number of cameras are necessary. Furthermore, each vehicle needs a Global Position System (GPS) receiver for sensing position information. Even when the vehicle is equipped with the GPS receiver, the precision is low and the receiver cannot obtain height information. Thus, there is a problem that the transformed video may become the one captured at a viewpoint far distant from the driver's viewpoint. Furthermore, the method disclosed in Non-patent Reference 1 results in another problem that only an overhead view from above an intersection can be generated, and that it is difficult to make an intuitive determination from which direction a vehicle or a pedestrian enters the intersection at first glance of images from intersection information.

SUMMARY OF THE INVENTION

The present invention has been conceived to solve the problems, and has an object of providing a blind spot display apparatus that can display, from a driver's point of view, an image of a blind spot at an intersection that cannot be seen from the driver under normal circumstances, even when the vehicle is not equipped with a GPS receiver.

The blind spot display apparatus according to the present invention has the following configuration to solve the problems. The blind spot display apparatus according to the present invention is a blind spot display apparatus that displays an image of an object in a blind spot of a vehicle, and includes: a storage unit configured to store omni-directional images which have been obtained from cameras at different positions and each of which includes the image of the object in the blind spot and an image of the vehicle; an object model generating unit configured to calculate a coordinate position of the object seen from a predetermined camera among the cameras, using a difference between coordinate positions of the images of the object that are included in the omni-directional images; a vehicle model generating unit configured to calculate a coordinate position of the vehicle seen from the predetermined camera, using a difference between coordinate positions of the images of the vehicle that are included in the omni-directional images; and a display unit configured to display the image of the object as seen from the vehicle on a display, using the calculated coordinate positions of the object and of the vehicle, the image of the object being included in common in each of the omni-directional images. In the blind spot display apparatus, for example, the vehicle model generating unit may be configured to calculate the coordinate position of the vehicle seen from the predetermined camera, using a difference between a first point and a second point, the first point indicating the vehicle whose image is included in a predetermined one of the omni-directional images, and the second point (i) indicating the vehicle whose image is included in an other one of the omni-directional images that is different from the predetermined one of the omni-directional images and (ii) corresponding to the first point.

Furthermore, the blind spot display apparatus according to the present invention is a blind spot display apparatus that is installed in a vehicle and displays information on a blind spot that cannot be seen from the vehicle, and includes: an image storage unit configured to store captured images obtained at different positions; an object model generating unit configured to identify points of each image of an object based on the images of the object included in the captured images, and to calculate respective positions of the identified points at which the images of the object are included to obtain a position of the object; a vehicle model generating unit configured to identify points of each image of the vehicle based on the images of the vehicle included in the captured images, and to calculate respective positions of the identified points at which the images of the vehicle are included to obtain a position of the vehicle; a vehicle viewpoint-coordinate transforming unit configured to transform the position of the object calculated by the object model generating unit into display coordinates relative to the position of the vehicle calculated by the vehicle model generating unit; and a display unit configured to display information on the object using the display coordinates.

In the blind spot display apparatus, the captured images are images captured by image generating units installed at positions at which both the image of the vehicle and an image of the blind spot that cannot be seen from the vehicle are captured, and each of the object model generating unit and the vehicle model generating unit is configured to obtain the captured images transferred from an outside of the blind spot display apparatus to the blind spot display apparatus, and use the captured images obtained.

The blind spot display apparatus does not calculate respective positions of the vehicle and the object from different data sets. In other words, both of the positions are calculated from the same data set that is the stored captured images. Thereby, the blind spot display apparatus does not need any complicated configuration using a large number of data sets but can be simply configured.

Furthermore, the blind spot display apparatus may include a determination unit that determines whether or not the object included in each of the images is an object in the blind spot. In addition, the blind spot display apparatus may not include such a determination unit, and may display information on the object without determining whether or not the object is an object in the blind spot.

Furthermore, the blind spot display apparatus according to an aspect of the present invention may include, for example: a selecting unit that selects two omni-directional image generating units in a capturing range including the own vehicle and a blind spot that cannot be seen from the own vehicle, from among the omni-directional image generating units that are placed on different three-dimensional coordinate positions at an intersection and capture omni-directional images, and transfers the two omni-directional images and each area of the omni-directional images to the omni-directional image storage unit via a network; a blind spot corresponding point search unit that searches the two omni-directional images held by the omni-directional image storage units or the portions of the omni-directional images for the image of the same object in the blind spot included therein, and determines blind spot corresponding points in the images of the blind spot; a blind spot position-coordinate calculating unit that calculates a three-dimensional coordinate position of the object within the blind spot, using a difference between pixel positions of blind spot corresponding points; an own-vehicle corresponding point search unit that searches the two omni-directional images held by the omni-directional image storage units or the portions of the omni-directional images for the image of the own vehicle included therein, and determines blind spot corresponding points in the images of the own vehicle; an own vehicle position-coordinate calculating unit that calculates a three-dimensional coordinate position of the own vehicle using the three-dimensional coordinate positions of the two omni-directional image generating units that have generated the two omni-directional images, and a difference between pixel positions of own vehicle corresponding points; an own-vehicle viewpoint coordinate transforming unit that transforms the three-dimensional coordinate position of the object within the blind spot into display coordinates based on the three-dimensional coordinate position of the own vehicle; and a display unit that allocates a pixel color of the blind spot corresponding points to the display coordinates according to a value of a depth after the coordinate transformation, wherein even a vehicle including no position sensing unit, such as a GPS, can see a situation of the blind spot at the intersection from the driver's viewpoint without any uncomfortable feeling.

Furthermore, the blind spot display apparatus according to an aspect of the present invention may perform three-dimensional transformation from omni-directional images of an intersection blind spot that cannot be seen from the driver under ordinary circumstances to images as if the driver saw the intersection blind spot, and calculate the driver's viewpoint with higher precision than the precision of a GPS, using the two omni-directional images. Here, the omni-directional images are generated by the two omni-directional image generating units.

The blind spot display apparatus according to the present invention performs three-dimensional transformation from omni-directional images of an intersection blind spot that cannot be seen from the driver under ordinary circumstances to images as if the driver saw the intersection blind spot, and calculates a driver's viewpoint with higher precision than the precision of a GPS using the omni-directional images, so that the driver can intuitively see the situation of the blind spot at the intersection from his/her viewpoint and detect danger more easily. Here, the omni-directional images are generated by the two omni-directional image generating units.

DETAILED DESCRIPTION OF THE INVENTION

Embodiments for implementing the present invention will be hereinafter described with reference to the drawings.

Embodiment 1

Figure 1:
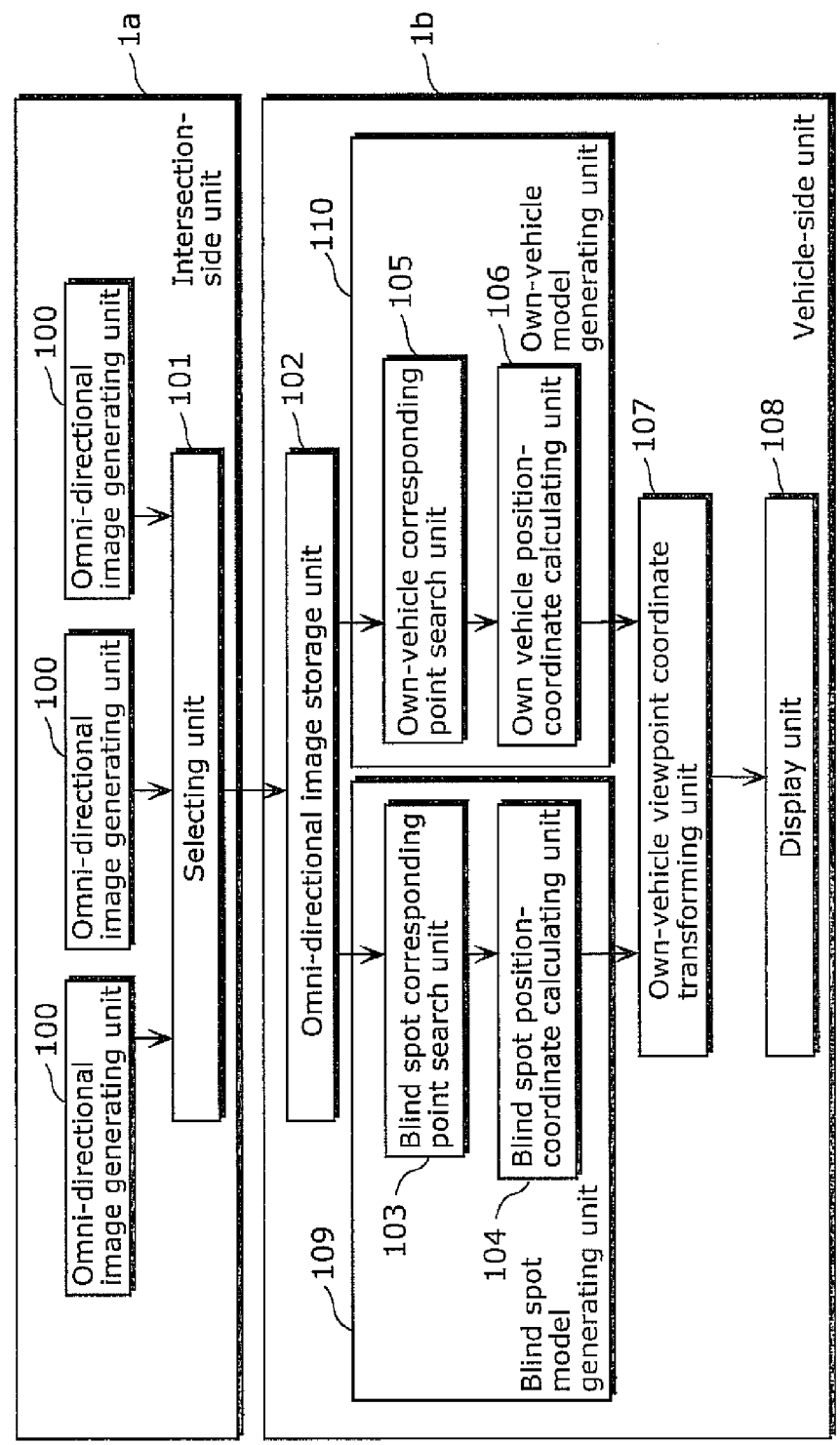
FIG. 1 is a block diagram illustrating a configuration of a blind spot display apparatus according to Embodiment 1.

FIG. 1 is a block diagram illustrating a configuration of a blind spot display apparatus 1 according to Embodiment 1 in the present invention.

Figure 19:
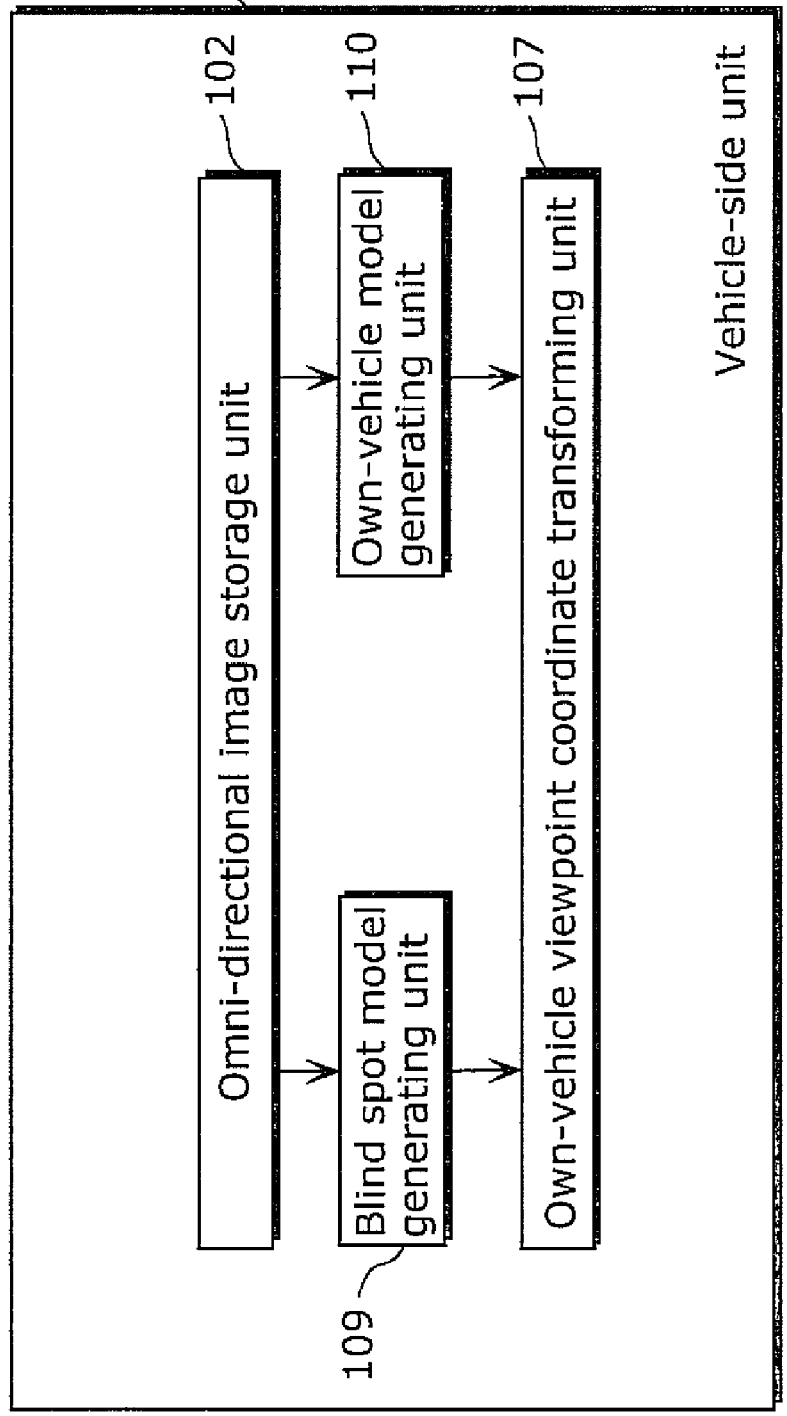
FIG. 19 is a block diagram illustrating a configuration of a vehicle-side unit of a blind spot display apparatus.

The blind spot display apparatus 1 includes an intersection-side unit 1a and a vehicle-side unit 1b. The vehicle-side unit 1b may be one of vehicle-side units 1b included in the blind spot display apparatuses 1 and installed in each vehicle. The blind spot display apparatus 1 includes: (i) the intersection-side unit 1a including a selecting unit 101 at an intersection where omni-directional image generating units 100 each of which obtains an omni-directional image are respectively placed on different three-dimensional position coordinates (see FIG. 3 and others); and (ii) the vehicle-side unit 1b including an omni-directional image storage unit 102, a blind spot corresponding point search unit 103, a blind spot position-coordinate calculating unit 104, an own-vehicle corresponding point search unit 105, an own vehicle position-coordinate calculating unit 106, an own-vehicle viewpoint coordinate transforming unit 107, and a display unit 108. Here, the blind spot display apparatus 1 includes a blind spot model generating unit 109 and an own-vehicle model generating unit 110. The blind spot model generating unit 109 includes the blind spot corresponding point search unit 103 and the blind spot position-coordinate calculating unit 104, whereas the own-vehicle model generating unit 110 includes the own-vehicle corresponding point search unit 105 and the own vehicle position-coordinate calculating unit 106 (see FIG. 19). Furthermore, the intersection-side unit 1a includes, for example, an infrastructure computer 101c (see FIG. 3) to implement a function of a functional block of the selecting unit 101. Causing the infrastructure computer 101c to execute software, the function of the functional block of the selecting unit 101 is implemented.

Figure 2:
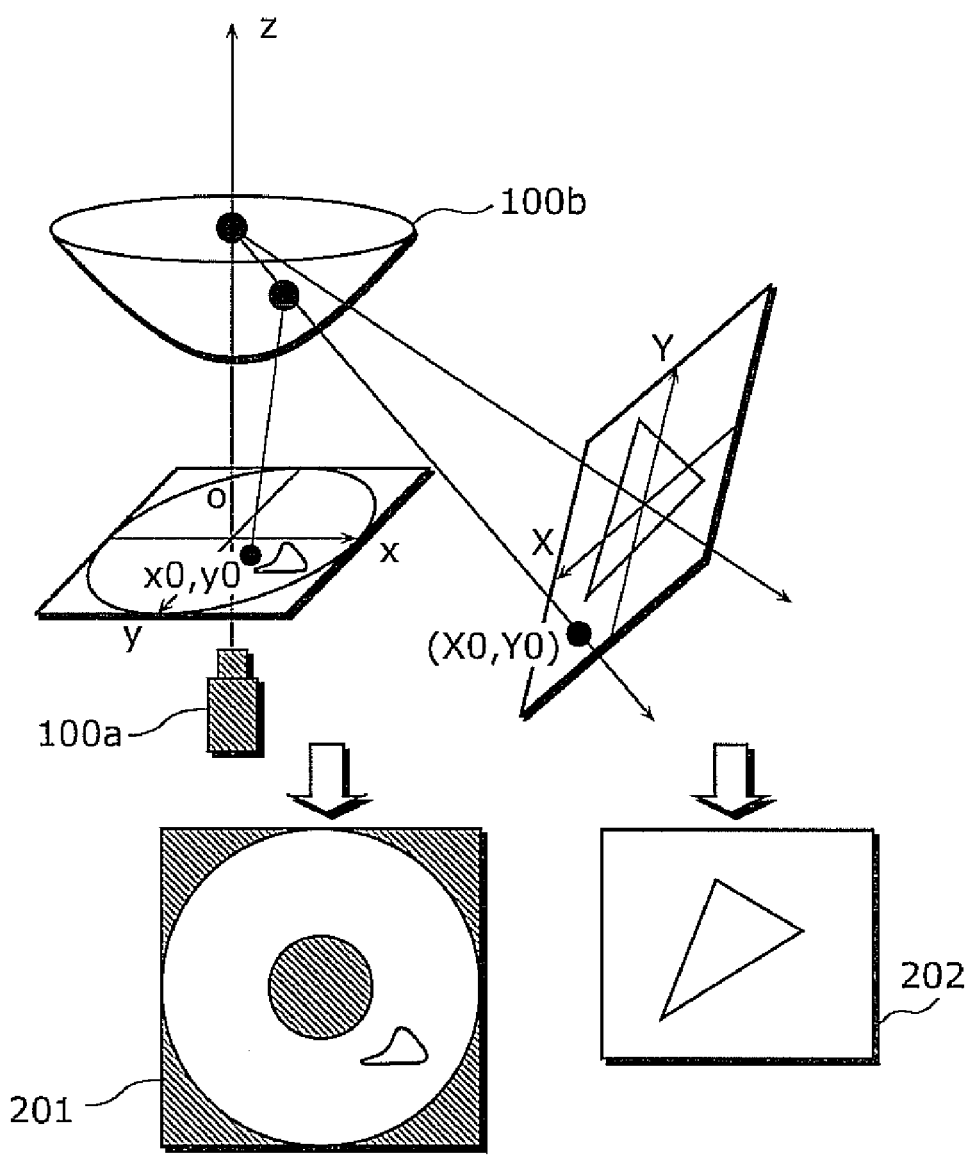
FIG. 2 illustrates an example of an omni-directional image generated by the omni-directional image generating unit illustrated in FIG. 1.

FIG. 2 illustrates an example of the omni-directional image generating unit 100.

The omni-directional image generating unit 100 generates an omni-directional image with respect to the three-dimensional position coordinates. The omni-directional image generating unit 100 is referred to as an overhead-view camera, an omni-directional camera, an all sky camera, and a 360-degree camera, and is implemented as one of these cameras to capture images. The representative implementation modes for capturing an omni-directional image include a concave mirror mode, a special lens mode, and a multiple-camera mode. FIG. 2 illustrates an example of an omni-directional image generated by the omni-directional image generating unit 100. In the concave mirror mode, a standard camera 100a (FIG. 2) equipped with a concave mirror 100b (FIG. 2) captures an image to generate an image in which a 360-degree landscape is mapped on a doughnut-shaped image as 201 in FIG. 2. For example, the selecting unit 101 (FIG. 1) uses perspective projection on the doughnut-shaped image so that the doughnut-shaped image can be transformed into an image (perspective projection image) seen in a randomly chosen direction as illustrated in 202 of FIG. 2. Thus, what can be obtained is an image with respect to an imaging device (omni-directional image generating unit 100) in the concave mirror mode, featuring the capability of a precise measurement of a distance to and a direction of an object.

In the special lens mode, a standard camera equipped with a fisheye lens captures an image to generate an image in which a 360-degree landscape is mapped on a circular image. Although the image can be transformed into the image seen in a randomly chosen direction by applying lens distortion correction and two-dimensional transformation on the generated image (circular image), a difficulty that lens distortion cannot be completely removed lies in the special lens mode. In the multiple-camera mode, each image generating unit includes cameras to capture images in different directions. The images captured by the cameras are successfully spliced together to generate one panoramic image. Although the calibration for controlling the splicing of images is complicated, the multiple-camera mode allows for generation of an image with higher definition and without distortion.

Although the specific configuration of the omni-directional image generating unit 100 is not limited according to the present invention, the assumption in this description is that the omni-directional image generating unit 100 generates an omni-directional image in the concave mirror mode at our convenience.

Back to FIG. 1, the selecting unit 101 in the intersection-side unit 1a selects two of the omni-directional image generating units 100 that are installed at an intersection and are in a position where images of an own vehicle and a blind spot that cannot be seen from the own vehicle entering the intersection are simultaneously captured in an image. Then, the selected two omni-directional image generating units 100 captures respective images, and the selecting unit 101 transfers the images to the omni-directional image storage unit 102 (FIG. 1) via a network.

Figure 3:
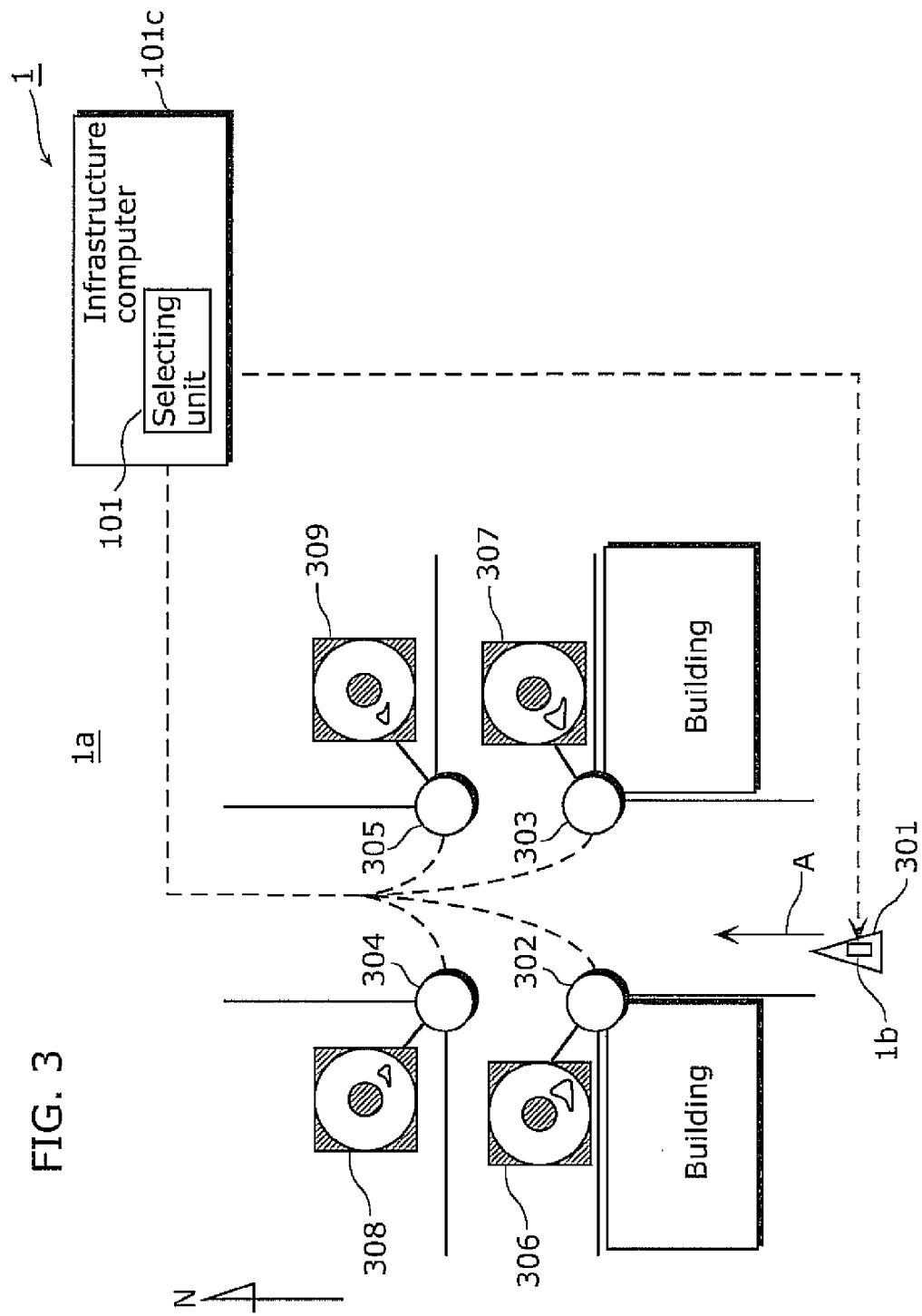
FIG. 3 illustrates a specific example of the selecting unit illustrated in FIG. 1.

FIG. 3 illustrates that omni-directional image generating units are installed at an intersection, and in particular, that four omni-directional image generating units are installed at a cross intersection so as to implement the present invention even when vehicles enter the intersection from any direction of north, south, east and west. In FIG. 3, the omni-directional image generating units are installed so that images of the own vehicle and the blind spot that cannot be seen from the own vehicle are captured in an image, even when vehicles enter the intersection from any direction of north, south, east and west. For example, the selecting unit 101 may select omni-directional image generating units 302 and 303 or 302 and 304 for an own vehicle 301 entering the intersection from south.

In FIG. 3, the four omni-directional image generating units 302, 303, 304, and 305 are respectively installed on the four corners of the cross intersection where two roads intersect crosswise (at a right angle).

The omni-directional image generating units 100 that generate omni-directional images are used in such a manner that an image of a wider blind spot at an intersection can be captured precisely.

Furthermore, two sets of omni-directional images selected by the selecting units 101 may include two first omni-directional images used by the blind spot corresponding point search unit 103 (FIG. 1) and two second omni-directional images used by the own-vehicle corresponding point search unit 105. At least one of the two first omni-directional images may be generated by the omni-directional image generating unit 100 different from the one generating one of or both of the second omni-directional images. In the example of FIG. 3, the selecting unit 101 may select the omni-directional image generating units 302 and 304 for the blind spot corresponding point search unit 103, and transfer omni-directional images 306 and 308 (FIG. 3) to the blind spot corresponding point search unit 103. Furthermore, the selecting unit 101 may select the omni-directional image generating units 302 and 303 for the own-vehicle corresponding point search unit 105, that is, omni-directional images 306 and 307, and transfer the selected omni-directional images 306 and 307 to the own-vehicle corresponding point search unit 105.

Furthermore, the selecting unit 101 may select two of the omni-directional image generating units that are installed at an intersection and are in a position where images of an own vehicle and a blind spot that cannot be seen from the own vehicle entering the intersection are simultaneously captured in an image, and transfer respective areas of two omni-directional images obtained by the selected two omni-directional image generating units to the omni-directional image storage unit 102. For example, when the selecting unit 101 selects the omni-directional image generating units 302 and 303 for the own vehicle 301 at the cross intersection in FIG. 3, an image of a blind spot to the left of the traveling direction of the own vehicle 301 is included in each of (i) an upper-left quarter of the omni-directional image 306 generated by the omni-directional image generating unit 302, and (ii) an upper-left quarter of the omni-directional image 307 generated by the omni-directional image generating unit 303. Furthermore, an image of a blind spot to the right of the traveling direction of the own vehicle 301 is included in each of (i) an upper-right quarter of the omni-directional image 306 generated by the omni-directional image generating unit 302, and (ii) an upper-right quarter of the omni-directional image 307 generated by the omni-directional image generating unit 303. The blind spot corresponding point search unit 103 can search for a blind spot corresponding point, with portions of the four omni-directional images. Similarly, an image of the own vehicle is included in a lower-right quarter of the omni-directional image 306 generated by the omni-directional image generating unit 302, and in a lower-left quarter of the omni-directional image 307 generated by the omni-directional image generating unit 303. The own-vehicle corresponding point search unit 105 can search for an own vehicle corresponding point, with respective areas of the two omni-directional images. Although assumed in the example is an intersection having a cross shape, the intersection does not have to be a cross-shaped intersection. Instead, the selecting unit 101 may segment an area of an intersection according to the shape, and transfer not an omni-directional image but an image per segment.

Figure 22:
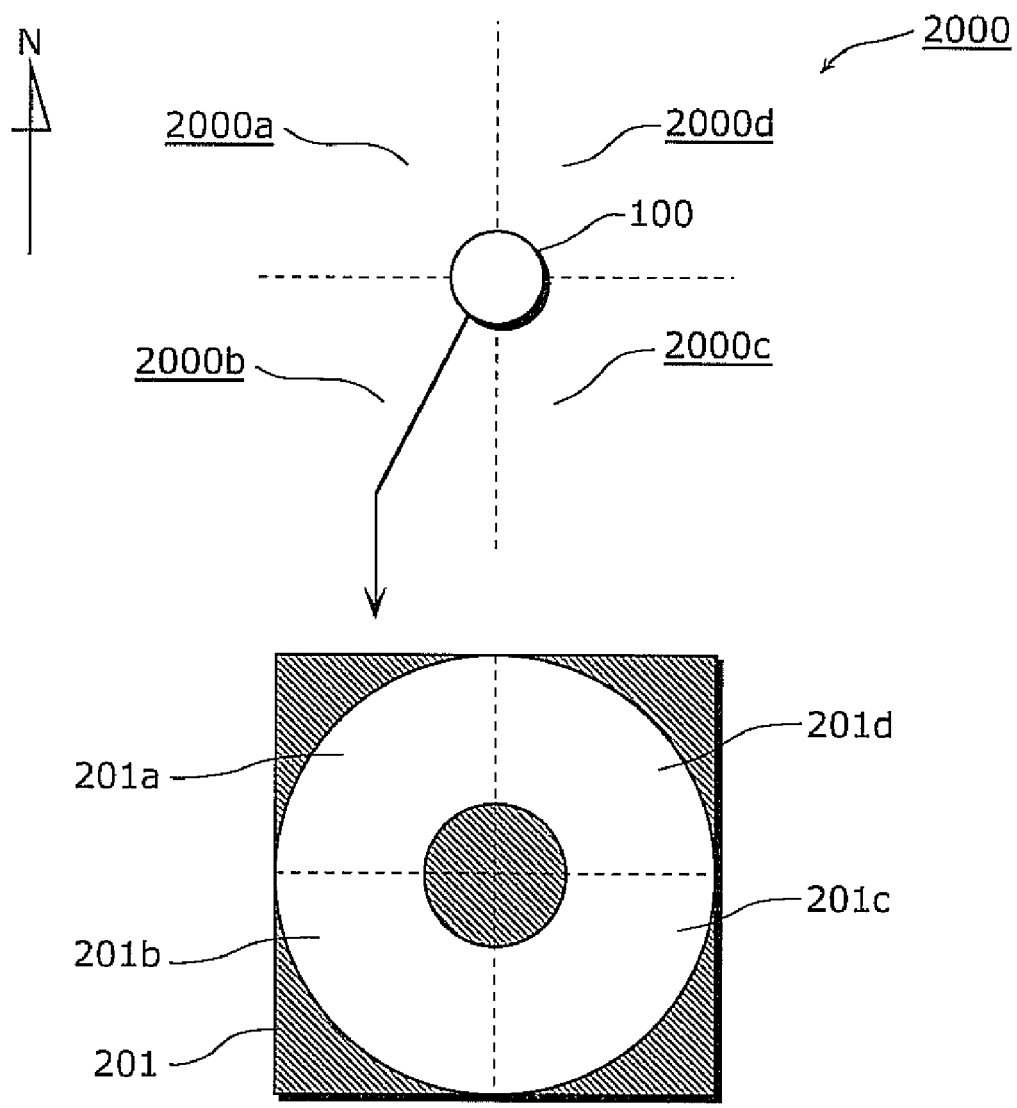
FIG. 22 illustrates an intersection, an upper-left quarter-size image, a lower-left quarter-size image, a lower-right quarter-size image, and an upper-right quarter-size image of an omni-directional image.

FIG. 22 illustrates an intersection 2000 at which the omni-directional image generating unit 100 is installed. The omni-directional image generating unit 100 captures an omni-directional image 201 including an upper-left quarter-size image 201a, a lower-left quarter-size image 201b, a lower-right quarter-size image 201c, and an upper-right quarter-size image 201d. The omni-directional image generating unit 100 is, for example, one of the omni-directional image generating units 302 and others in FIG. 3. The upper-left quarter-size image 201a, the lower-left quarter-size image 201b, the lower-right quarter-size image 201c, and the upper-right quarter-size image 201d of the omni-directional image 201 in FIG. 22 are obtained by capturing an upper-left quarter-size section 2000a, a lower-left quarter-size section 2000b, a lower-right quarter-size section 2000c, and an upper-right quarter-size section 2000d of the intersection 2000 with respect to the omni-directional image generating unit 100.

The blind spot to the left of the traveling direction of the own vehicle 301 is, for example, a blind spot present at the intersection where the own vehicle 301 turns left. In contrast, the blind spot to the right of the traveling direction of the own vehicle 301 is, for example, a blind spot present at the intersection where the own vehicle 301 turns right.

Furthermore, the selecting unit 101 searches each of the omni-directional images for a position and an area of the image of the own vehicle included therein, and selects two of the omni-directional image generating units that generate the omni-directional images respectively having the largest areas of the own vehicle, so that the search precision of the own-vehicle corresponding point search unit 105 can be improved. In other words, the selecting unit 101, for example, calculates the size of an area of each item (own vehicle) in each of the omni-directional images, and selects two of the omni-directional images having the largest size and the second largest size of the areas calculated. The omni-directional image including the largest area of the own vehicle 301 is obviously the omni-directional image generated by the omni-directional image generating unit that is closest to the own vehicle 301. In other words, selecting two of the omni-directional image generating units that are closest to the own vehicle 301 enables reduction of a search error by the own-vehicle corresponding point search unit 105. In FIG. 3, selecting the omni-directional image generating units 302 and 303 that generate the omni-directional images including the largest areas of the own vehicle 301 increases the precision of searching for own vehicle corresponding points by the own-vehicle corresponding point search unit 105.

Furthermore, the selecting unit 101 does not necessarily have to transfer an omni-directional image or an area of the omni-directional image to the omni-directional image storage unit 102. For example, when a distance between an intersection and an own vehicle is very far, displaying information on a blind spot at the intersection does not mean anything, and the necessity to display the blind spot based on a viewpoint of the own vehicle is low. Thus, only when the size of the area of the own vehicle is equal to or larger than a predetermined size, there is no problem for the selecting unit 101 to search each of the omni-directional images for a position and an area of an image of an own vehicle included therein, and transfer the selected omni-directional image or an area of the omni-directional image to the omni-directional image storage unit 102.

One example of the selecting unit 101 can be implemented as follows. In the blind spot display apparatus 1 including the selecting unit 101 according to the example, the intersection-side unit 1a includes an own vehicle detecting unit that detects whether or not the own vehicle 301 is present on each road connecting to an intersection. Furthermore, the blind spot display apparatus 1 includes a road correspondence holding unit that holds correspondences in which the roads connecting to the intersection are associated with the omni-directional image generating units 100 that are relatively appropriate for capturing the images of the roads. Then, the selecting unit 101 selects an omni-directional image captured by the omni-directional image generating unit 100 associated with the road detected by the own vehicle detecting unit in the correspondence held by the road correspondence holding unit. Here, the road correspondence holding unit stores a correspondence in which two of the omni-directional image generating units 100 that are appropriate to be used by the vehicle-side unit 1b are associated with one road. The selecting unit 101 selects the omni-directional images 201 respectively captured by the omni-directional image generating units 100 associated therewith. Thereby, the selecting unit 101 can be implemented with the simpler configuration in that the appropriate omni-directional image generating unit 100 having the correspondence with the road on which the own vehicle 301 has been detected is selected based on the held correspondence. Here, the road correspondence holding unit may include a first road correspondence holding unit that holds correspondences of omni-directional images used by the blind spot model generating unit 109, and a second road correspondence holding unit that holds correspondences of omni-directional images used by the other own-vehicle model generating unit 110.

The omni-directional image storage unit 102 stores an omni-directional image or an area of the omni-directional image transmitted from the intersection-side unit 1a to the vehicle-side unit 1b via the network, and transfers the omni-directional image or the portion of the omni-directional image to the blind spot corresponding point search unit 103 and the own-vehicle corresponding point search unit 105 as necessary.

The blind spot corresponding point search unit 103 searches the omni-directional images that are generated by two of the omni-directional image generating units selected by the selecting unit 101 and are stored in the omni-directional image storage unit 102, for the image of the same object in the blind spot included therein, and determines blind spot corresponding points on the images. The two omni-directional images generated with respect to different position coordinates include the image of a blind spot at the intersection. Thus, the blind spot corresponding point search unit 103 searches the two omni-directional images for points corresponding to the object within the blind spot.

The blind spot corresponding point search unit 103 may perform image matching for the blind spot corresponding points not on the omni-directional images but on perspective projection images obtained by performing perspective projection on an image seen in the direction of the blind spot from the own vehicle 301. The perspective projection images are obtained by transforming doughnut-shaped omni-directional images to images seen in the direction of the blind spot, and are the same as planar rectangular images as if a general camera captured images in the direction of the blind spot.

Figure 4:
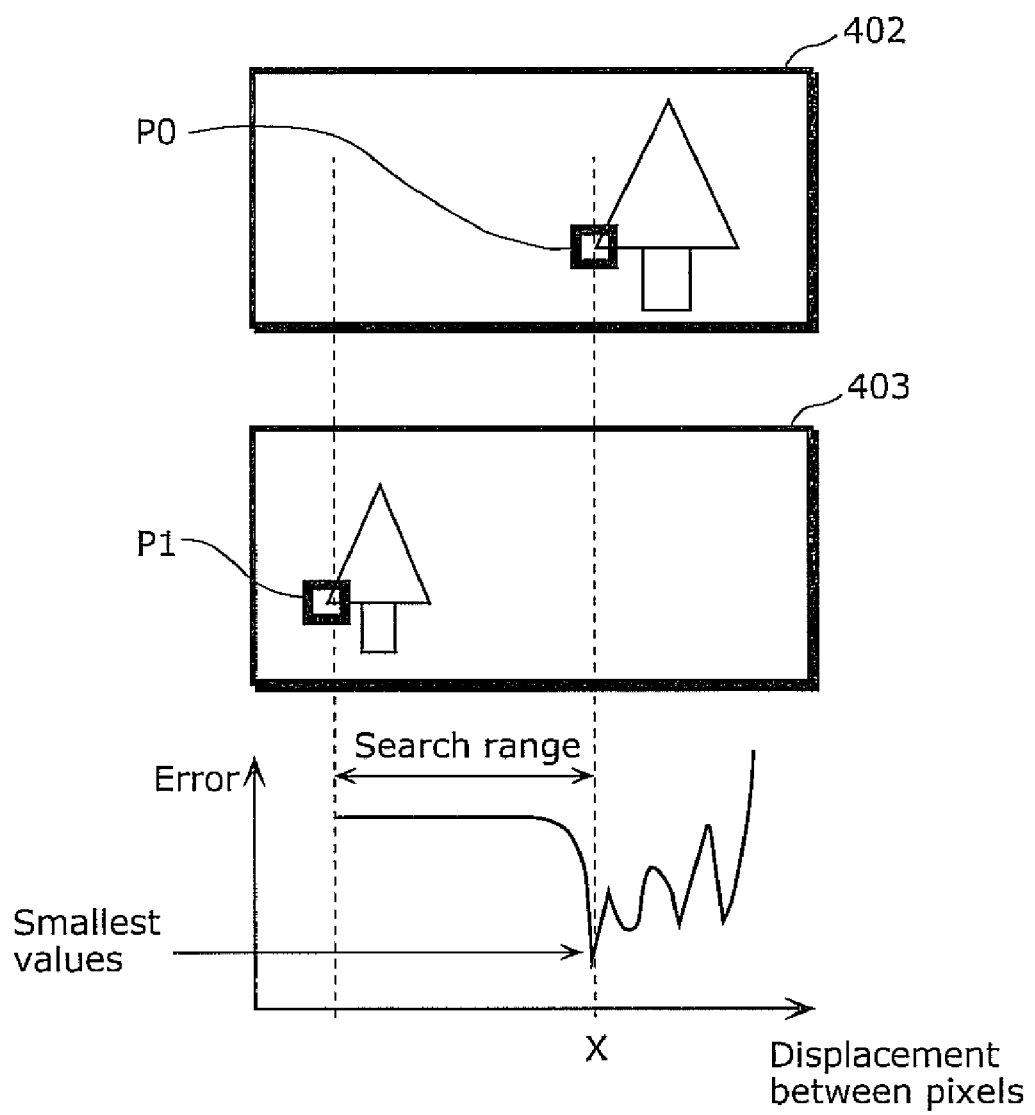
FIG. 4 illustrates blind spot corresponding points obtained by the blind spot corresponding point search unit illustrated in FIG. 1.
Figure 5:
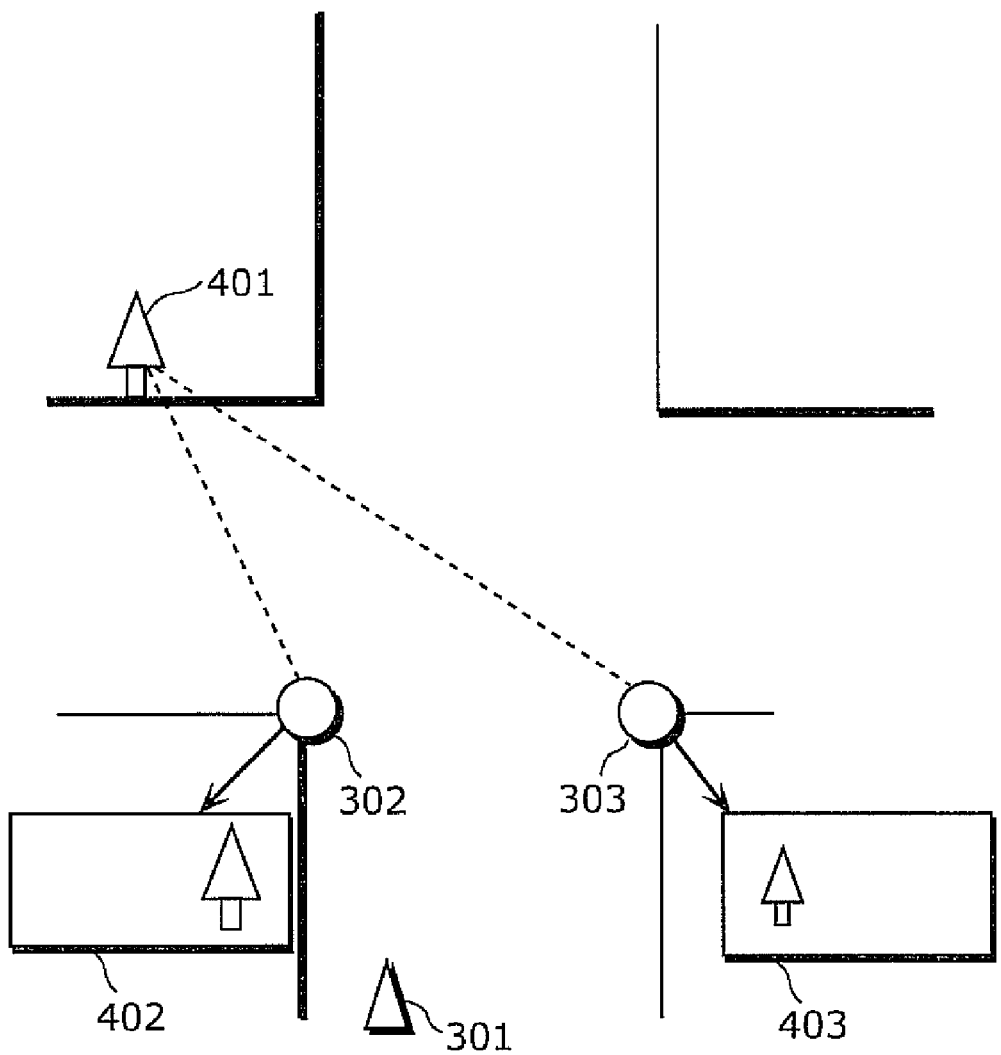
FIG. 5 illustrates blind spot corresponding points obtained by the blind spot corresponding point search unit illustrated in FIG. 1.

FIGS. 4 and 5 illustrate that the blind spot corresponding point search unit 103 searches for blind spot corresponding points.

In other words, the blind spot corresponding point search unit 103 performs image matching to find which pixel in an omni-directional image 403 corresponds to a pixel P0 (X0, Y0) of an image of an object 401 (FIG. 5) on an omni-directional image 402 as illustrated in FIG. 4. When the pixel P0 (X0, Y0) corresponds to a search result P1 (X1, Y1) (pixel P1), the blind spot corresponding point search unit 103 determines the P0 and P1 as the blind spot corresponding points. The blind spot corresponding point search unit 103 searches all objects in omni-directional images for the blind spot corresponding points.

Here, the lower graph of FIG. 4 illustrates a case where the blind spot corresponding point search unit 103 performs image matching to search for corresponding points, wherein the horizontal axis shows the measurement of a difference between pixels of two points, and the vertical axis shows the matching error of the difference between pixels. The blind spot corresponding point search unit 103 identifies two points having the smallest error values as the blind spot corresponding points.

Here, as a distance from an omni-directional image generating unit to a blind spot on a planar rectangular image is longer, a distance between objects within the blind spot is shorter on the image. Thus, when an image of an object in a blind spot to the left of the traveling direction of the own vehicle 301 is included in two perspective projection images, an X coordinate of a corresponding point on one of the perspective projection images that corresponds to the omni-directional image generated in a position closer to the left blind spot is equal to or larger than an X coordinate of a corresponding point on the other one of perspective projection images. Furthermore, when an image of an object in a blind spot to the right of the traveling direction of the own vehicle 301 is included in two perspective projection images, an X coordinate of a corresponding point on one of the perspective projection images that corresponds to the omni-directional image generated in a position closer to the right blind spot on the right is equal to or smaller than an X coordinate of a corresponding point on the other one of perspective projection images. Using these features, the matching process can be effectively performed. In other words, the blind spot corresponding points of a blind spot to the left of the traveling direction of the own vehicle are searched by performing the matching process sequentially from left to right of pixels in a perspective projection image with respect to pixels on the other perspective projection image corresponding to the omni-directional image generated in a position closer to the left blind spot. Alternatively, the blind spot corresponding points of a blind spot to the right of the traveling direction of the own vehicle are searched by performing the matching process sequentially from right to left of pixels in a perspective projection image with respect to pixels on the other perspective projection image corresponding to the omni-directional image generated in a position closer to the right blind spot.

As described above, the matching process can be more reliably and accurately performed in a favorable manner with reference to one of the two blind spot corresponding points that is included in a larger image that is precisely captured, that is, an enlarged image. Here, the two blind spot corresponding points correspond to each other.

The blind spot position-coordinate calculating unit 104 calculates three-dimensional position coordinates of an object in a blind spot, using a difference amount between pixel positions of the blind spot corresponding points obtained by the blind spot corresponding point search unit 103. The elements of the three-dimensional position coordinates are represented by, with respect to the own vehicle 301, an X coordinate axis as a horizontal direction (lateral direction in FIG. 5), a Y coordinate axis as a vertical direction (normal to a plane of the page of FIG. 5), and a Z coordinate axis as a depth direction (lengthwise direction in FIG. 5).

Figure 6:
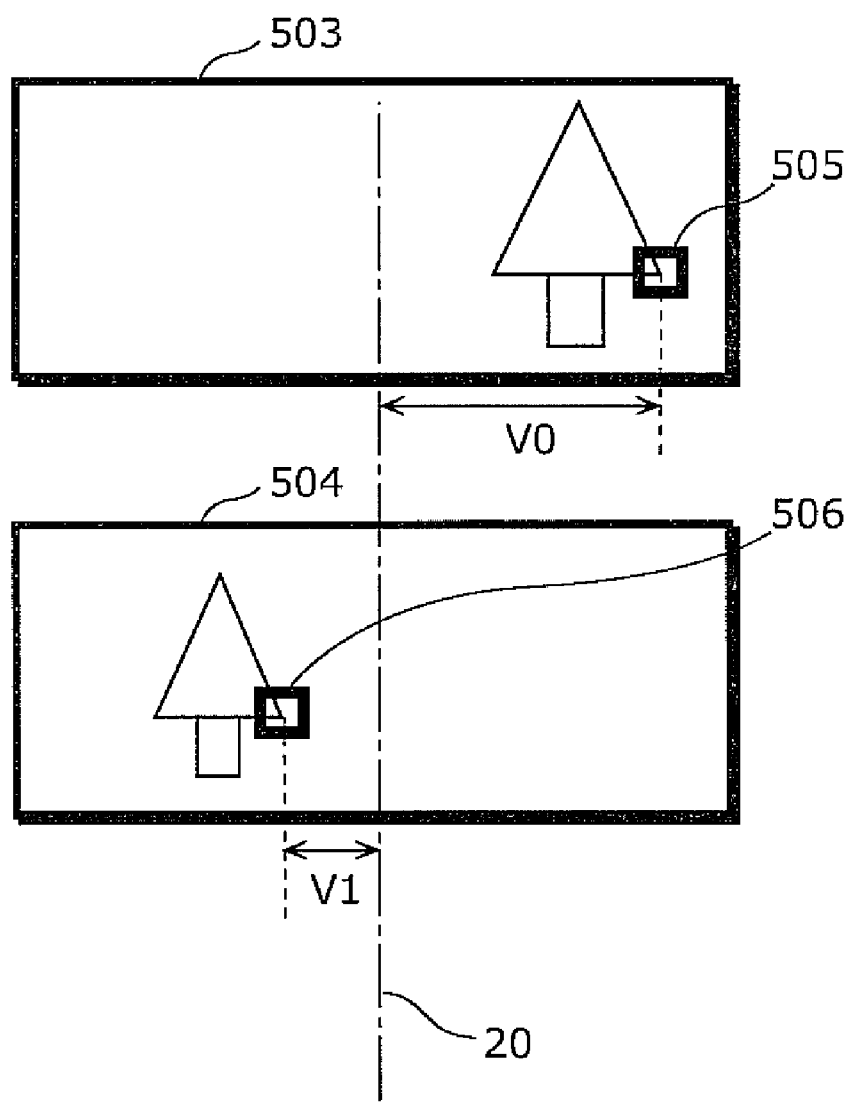
FIG. 6 is a drawing for describing the blind spot position-coordinate calculating unit illustrated in FIG. 1.
Figure 7:
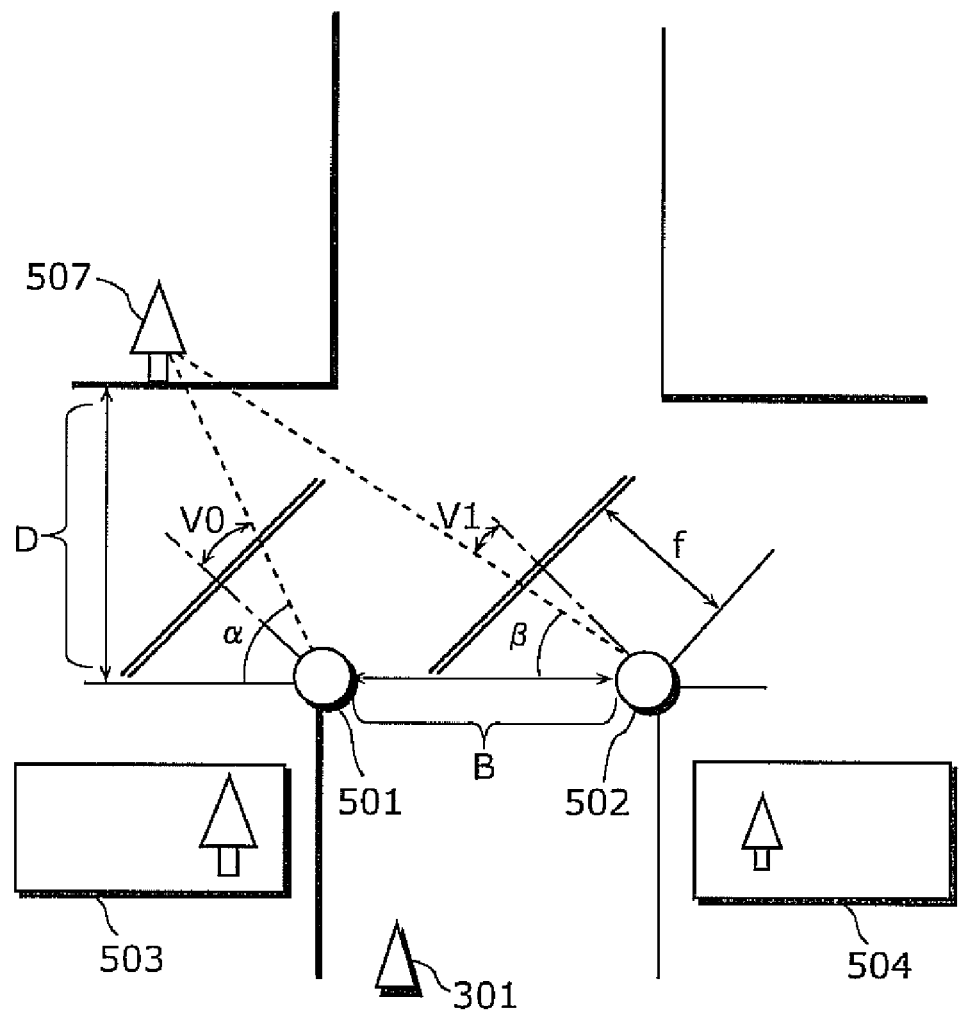
FIG. 7 is a drawing for describing the blind spot position-coordinate calculating unit illustrated in FIG. 1.

FIGS. 6 and 7 are drawings for describing the blind spot position-coordinate calculating unit 104 of the blind spot display apparatus 1 at an cross intersection. More specifically, FIGS. 6 and 7 illustrate processes in which the selecting unit 101 selects omni-directional image generating units 501 and 502 (FIG. 7) from the omni-directional image generating units, and the blind spot position-coordinate calculating unit 104 uses omni-directional image 503 and 504 (FIG. 7) and calculates three-dimensional position coordinates of an object 507 (FIG. 7) corresponding to the blind spot corresponding points 505 and 506.

For example, the following describes a method of calculating the three-dimensional position coordinates of an object within a blind spot, using the blind spot corresponding points on omni-directional images. Assume a distance between the two omni-directional image generating units 501 and 502 as B, and respective angles each between (i) a line segment from the center of one of the omni-directional images 503 and 504 to a blind spot corresponding point and (ii) the corresponding one of the two omni-directional image generating units 501 and 502 as $\alpha$ and $\beta$. A depth distance D relative to each of the omni-directional image generating units 501 and 502 can be calculated by $D=B*\tan(\alpha)*\tan(\beta)/(\tan(\alpha)-\tan(\beta))$, and D corresponds to a Z coordinate of an object corresponding to the blind spot corresponding points. Furthermore, when the blind spot corresponding point search unit 103 performs perspective projection in the direction of the blind spot, the corresponding three-dimensional position coordinates can be calculated using the blind spot corresponding points on the perspective projection images as follows. In other words, assuming the distance between two omni-directional image generating units as B, a focal distance between the omni-directional image generating units as f, and respective difference amounts between the corresponding points and the center of the images as V0 and V1, the depth distance D relative to each of the omni-directional image generating units can be calculated by $D=B*(f+V1)*(f-V0)/(2*f*(V1+V0))$, and D corresponds to a Z coordinate of an object corresponding to the blind spot corresponding points. An X coordinate of the object corresponding to the blind spot corresponding points can be calculated using the angle $\alpha$ between the center of the omni-directional image and the blind spot corresponding point. Furthermore, a Y coordinate thereof can be calculated using the distance between the center of the omni-directional image and the blind spot corresponding point on the image, and the Y coordinate is equal to a Y coordinate obtained by performing perspective projection on the blind spot corresponding point.

Figure 8:
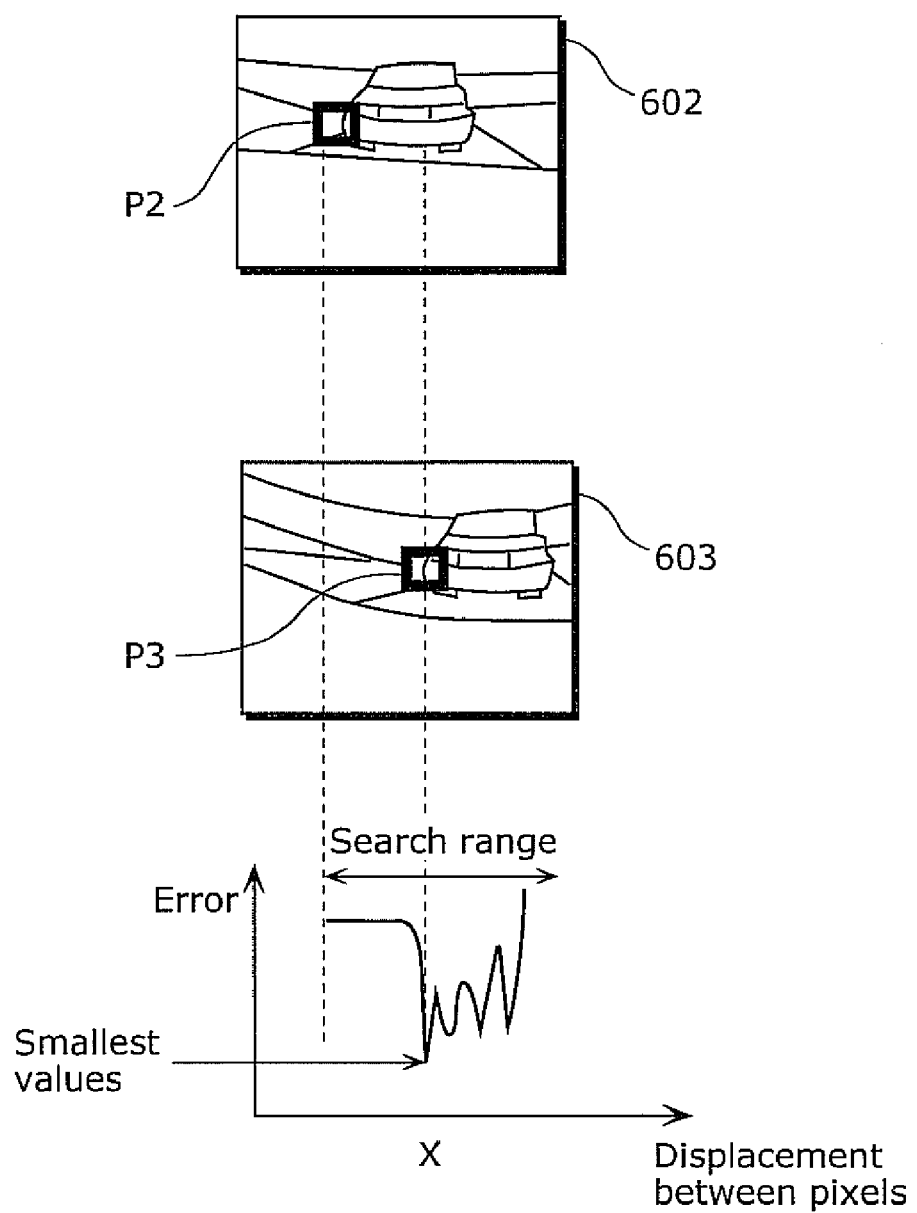
FIG. 8 illustrates own vehicle corresponding points obtained by the own-vehicle corresponding point search unit illustrated in FIG. 1.
Figure 9:
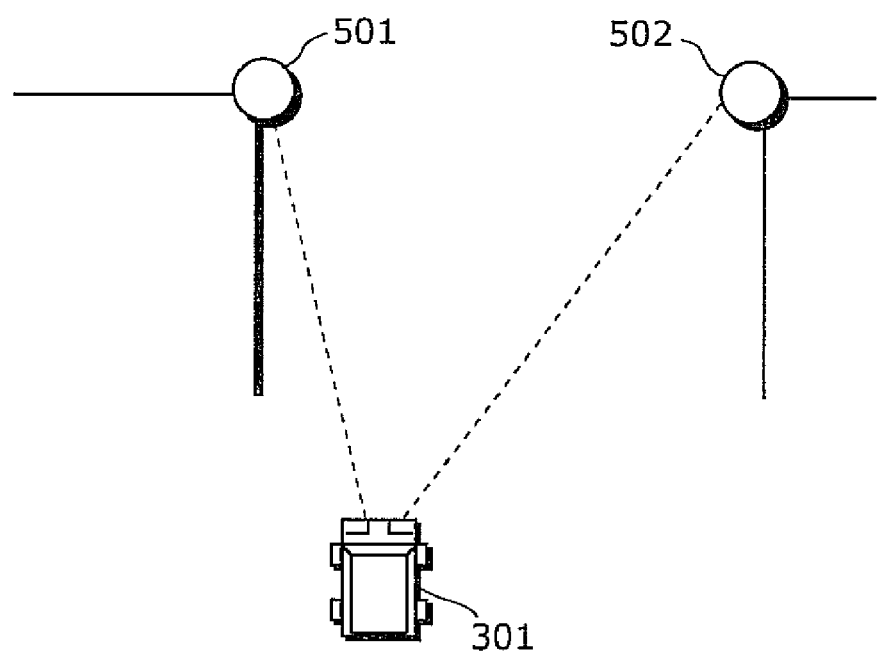
FIG. 9 illustrates own vehicle corresponding points obtained by the own-vehicle corresponding point search unit illustrated in FIG. 1.

FIGS. 8 and 9 illustrate processes of the own-vehicle corresponding point search unit 105.

The own-vehicle corresponding point search unit 105 searches the omni-directional images generated by two of the omni-directional image generating units selected by the selecting unit 101 and stored in the omni-directional image storage unit 102 for the images of the own vehicle, and determines own vehicle corresponding points on the images. The two omni-directional images generated with respect to different position coordinates include the images of the own vehicle, respectively. Thus, the own-vehicle corresponding point search unit 105 searches the two omni-directional images for points corresponding to the own vehicle. FIGS. 8 and 9 specifically illustrate the own vehicle corresponding points searched by the own-vehicle corresponding point search unit 105. The own-vehicle corresponding point search unit 105 performs image matching to find which pixel in an omni-directional image 603 corresponds to a pixel P2 (X2, Y2) of an image of the own vehicle 301 on an omni-directional image 602 (FIG. 8). As a result of the matching, when the pixel P2 (X2, Y2) corresponds to a pixel P3 (X3, Y3), the own-vehicle corresponding point search unit 105 identifies the pixels P2 and P3 as the own vehicle corresponding points. Although the matching is on a per-pixel basis, the own-vehicle corresponding point search unit 105 may perform search per plural pixels making up an image of an own vehicle.

Here, the lower graph of FIG. 8 illustrates a case where the own-vehicle corresponding point search unit 105 performs image matching, wherein the horizontal axis shows the measurement of a difference between pixels of two points, and the vertical axis shows the matching error of the difference between pixels. The own-vehicle corresponding point search unit 105 identifies two points having the smallest error values as the own vehicle corresponding points.

Figure 10:
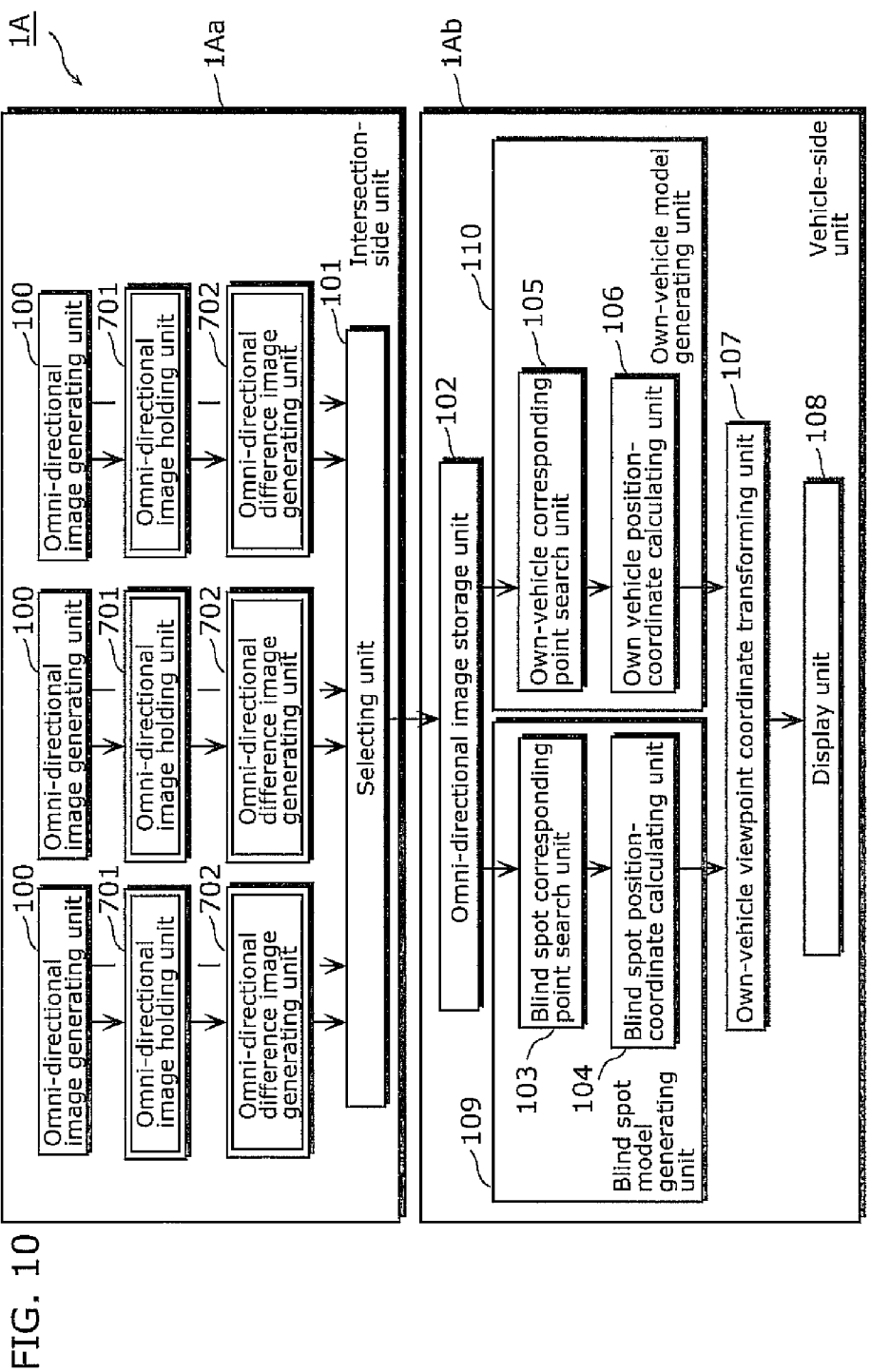
FIG. 10 is a block diagram illustrating a configuration of a blind spot display apparatus additionally including omni-directional image holding units and omni-directional difference image generating units according to Embodiment 1.

FIG. 10 illustrates a variation of a blind spot display apparatus 1A.

Hereinafter, the variation of the blind spot display apparatus 1A will be described. FIG. 10 is a block diagram illustrating a configuration of the blind spot display apparatus 1 (hereinafter referred to as the blind spot display apparatus 1A) additionally including omni-directional image holding units 701 and omni-directional difference image generating units 702. The blind spot display apparatus 1A includes the omni-directional image holding units 701 each of which holds an omni-directional image without an image of the own vehicle, and the omni-directional difference image generating units 702 each of which generates a difference image between the omni-directional image held by a corresponding one of the omni-directional image holding units 701 and the omni-directional image generated by a corresponding one of the omni-directional image generating units 100. The blind spot display apparatus 1A having such a configuration does not need to perform image matching on the images of the own vehicle, and the generated difference image is equivalent to the own vehicle corresponding points extracted by the background subtraction.

The omni-directional image holding units 701 and the omni-directional difference image generating units 702 may be implemented, for example, by the infrastructure computer 101c in FIG. 3 as well as the implementation of the selecting unit 101.

Figure 11:
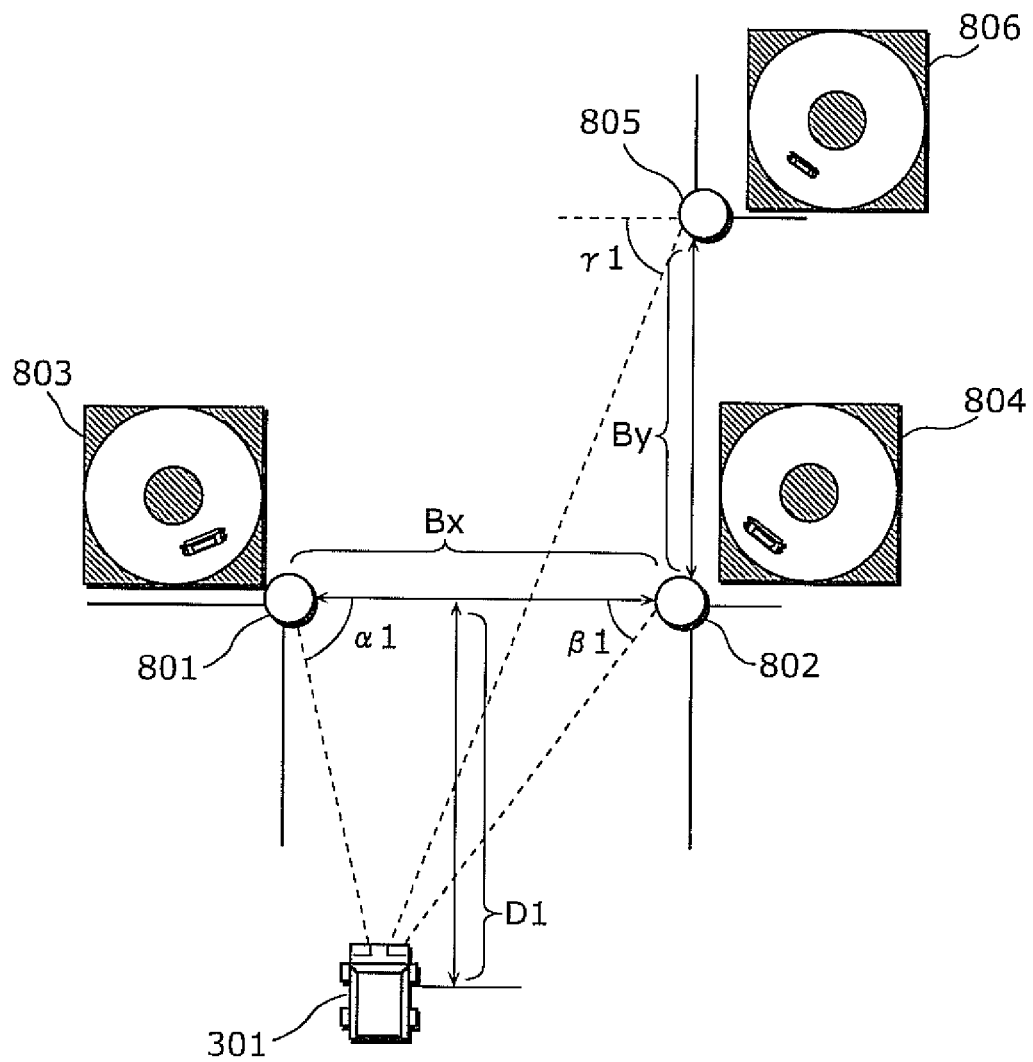
FIG. 11 is a drawing for describing the own vehicle position-coordinate calculating unit illustrated in FIG. 1.

FIG. 11 illustrates processes of the own vehicle position-coordinate calculating unit 106 (FIG. 1).

Aside from the description of the variation, the own vehicle position-coordinate calculating unit 106 calculates three-dimensional position coordinates of the own vehicle from a difference amount between pixel positions of the own vehicle corresponding points obtained by the own-vehicle corresponding point search unit 105. The elements of the three-dimensional position coordinates are represented by, with respect to the own vehicle 301, the X coordinate axis as the horizontal direction, the Y coordinate axis as the vertical direction, and the Z coordinate axis as the depth direction. FIG. 11 illustrates processes that in a blind spot display apparatus at a cross intersection, the selecting unit 101 selects omni-directional image generating units 801 and 802 from the omni-directional image generating units, and the own-vehicle corresponding point search unit 105 uses omni-directional images 803 and 804 and calculates the three-dimensional position coordinates of the own vehicle 301 that correspond to the own vehicle corresponding points. Assume a distance between the two omni-directional image generating units 801 and 802 as Bx, and respective angles each between (i) a line segment from the center of one of the omni-directional images 803 and 804 to a corresponding one of the own vehicle corresponding points and (ii) a line segment connecting the two omni-directional image generating units 801 and 802 as $\alpha 1$ and $\beta 1$. A depth distance D1 relative to each of the omni-directional image generating units 801 and 802 can be calculated by D1=Bx*tan($\alpha 1$)*tan($\beta 1$)/(tan($\alpha 1$)+tan($\beta 1$)), and D1 corresponds to a Z coordinate (depth distance) of the own vehicle corresponding to the own vehicle corresponding points. An X coordinate of the object corresponding to the blind spot corresponding points can be calculated by D1/tan($\alpha 1$). Furthermore, a Y coordinate thereof can be calculated using the distance between the center of the omni-directional image and the blind spot corresponding point on the image, and the Y coordinate is equal to a Y coordinate obtained by performing perspective projection on the blind spot corresponding point.

Similarly, when the selecting unit 101 selects the omni-directional image generating units 801 and 805, and the own-vehicle corresponding point search unit 105 uses the omni-directional images 803 and 806 and calculates the three-dimensional position coordinates of the own vehicle that correspond to the own vehicle corresponding points, assuming respective distances between the two sets of the omni-directional image generating units 801 and 802, and 802 and 805 as Bx and By, and respective angles each between a line segment from the center of one of the omni-directional images 803 and 804 to a corresponding one of the own vehicle corresponding points and a line segment connecting the two omni-directional image generating units 801 and 802 as $\alpha 1$ and $\gamma 1$, a depth distance D1 relative to each of the omni-directional image generating units 801 and 802 can be calculated by D1=Bx-By*tan($\alpha 1$)/(tan($\alpha 1$)+tan($\gamma 1$)), and D1 corresponds to a Z coordinate (depth distance) of the own vehicle corresponding to the own vehicle corresponding points. The X coordinate of the object corresponding to the blind spot corresponding points can be calculated by D1/tan($\alpha 1$).

Although the calculated three-dimensional position coordinates of the own vehicle may be used as it is, the own vehicle position-coordinate calculating unit 106 may correct position information with low precision, using a position sensor, such as a GPS and an acceleration sensor. In other words, the own vehicle position-coordinate calculating unit 106 may use information obtained from these sensors for the correction. As such, combining the blind spot display apparatus with the correction technique based on information obtained by other sensors results in obtainment of own-vehicle position coordinates with certain precision guaranteed.

The own-vehicle viewpoint coordinate transforming unit 107 transforms, into display coordinates, the three-dimensional position coordinates of an object within the blind spot calculated by the blind spot position-coordinate calculating unit 104 based on the three-dimensional position coordinates of the own vehicle calculated by the own vehicle position-coordinate calculating unit 106. In order to transform the three-dimensional position coordinates of the object to two dimensional display coordinates, the transformation to the two dimensional display coordinates needs the processes of camera transform, projective transformation, and viewport transformation.

The camera transform is performed by multiplying, with the three-dimensional position coordinates of the object, (i) the three-dimensional position coordinates of the own vehicle 301 that is a base point of view, (ii) three-dimensional position coordinates to be seen, and (iii) a camera transform matrix generated based on a slope of the base point of view. Furthermore, the projective transformation is performed by multiplying, with the three-dimensional position coordinates obtained through the camera transform, a projective transformation matrix generated based on (i) a width of vision (horizontal view angle) seen from the own vehicle 301 that is a base point of view, (ii) an aspect ratio, and (iii) a depth range in which coordinates are to be transformed. Furthermore, the viewport transformation is performed by multiplying, with the three-dimensional position coordinates obtained through the projective transformation, a viewport transformation matrix generated based on the size of a display on which information is to be displayed. The camera transform, projective transformation, and viewport transformation are supported by APIs named gluLookAt, glFrustum, and glViewport, respectively, after OpenGL for Embedded Systems (OpenGLES) 1.0 that is a general-purpose 3D graphics API. The functions of the own-vehicle viewpoint coordinate transforming unit 107 may be implemented, for example, using APIs of OpenGL.

Figure 21:
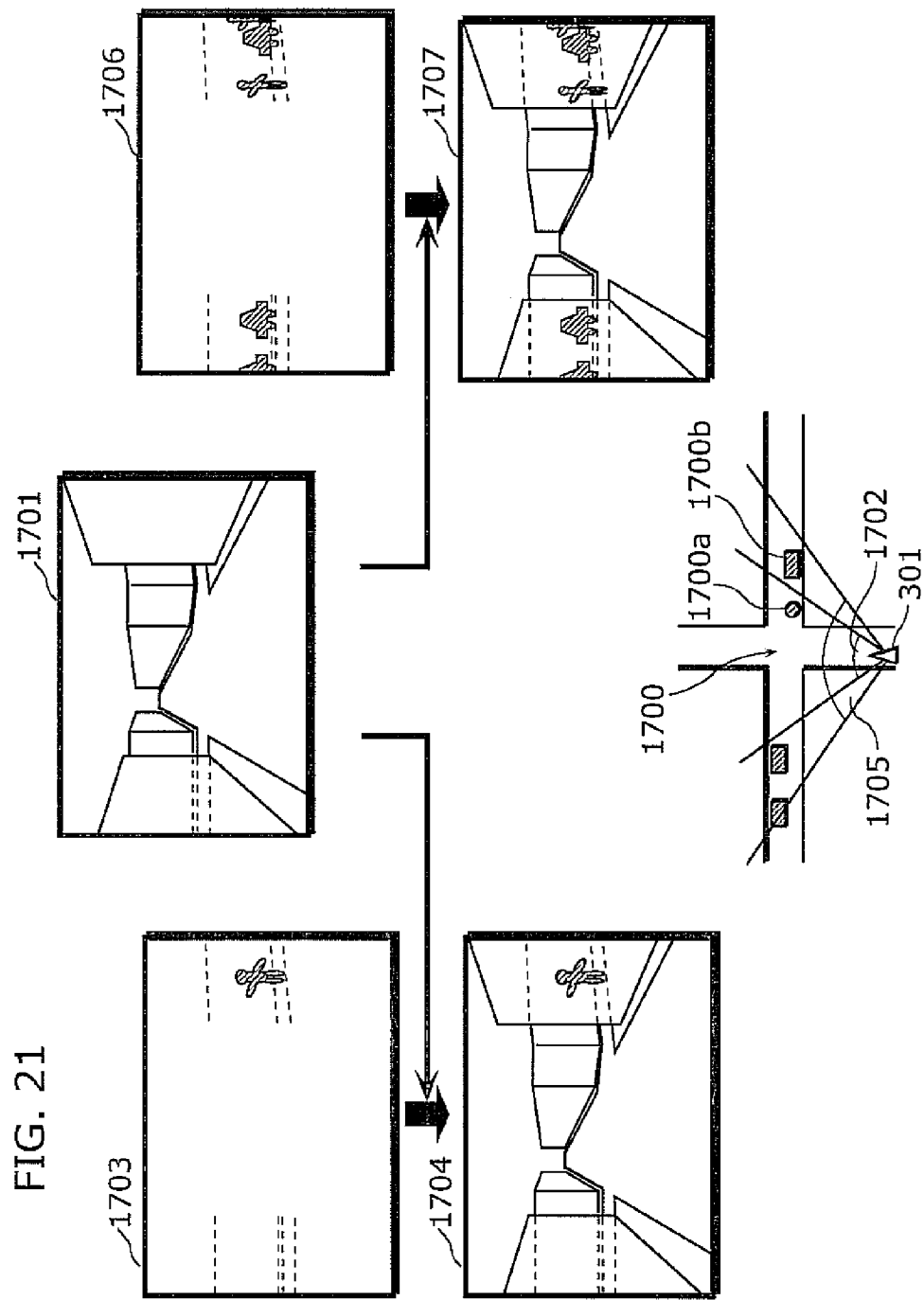
FIG. 21 is a drawing for describing that the blind spot display apparatus according to Embodiment 1 changes a range of display according to a horizontal view angle.

FIG. 21 illustrates an example in which an image of a blind spot is compressed.

When the omni-directional image storage unit 102 holds not an omni-directional image but a segment for each blind spot (see an intersection blind spot 1110 and an intersection blind spot 1111 in FIG. 14 to be described later), the own-vehicle viewpoint coordinate transforming unit 107 (FIG. 1) may transform the three-dimensional position coordinates of an object in the blind spot into display coordinates with a horizontal view angle wider than the actual horizontal view angle so as to compress an image of a wider blind spot. FIG. 21 illustrates changes in a range of a blind spot according to a horizontal view angle to be used in the projective transformation matrix. In an actual view 1701 seen from the own vehicle 301 at an intersection 1700, a blind spot occurs behind the wall. The own-vehicle viewpoint coordinate transforming unit 107 sets an angle 1702 that is the same as the actual horizontal view angle seen from the own vehicle 301 to the projective transformation matrix. With the present invention being applied, coordinates of a blind spot in the actual range are to be transformed, an image 1703 is generated, and the generated image 1703 is superimposed on the actual view 1701 for display. Thus, the own vehicle can view a superimposed display image 1704. In the superimposed display image 1704, a blind spot with an actual range is displayed. When the own-vehicle viewpoint coordinate transforming unit 107 sets an angle 1705 wider than the angle 1702 that is the actual horizontal view angle seen from the own vehicle 301, a range wider than the actual range is to be mapped in the same display size. Thereby, the coordinates are transformed as if an image was compressed in the horizontal direction, an image 1706 is generated, and the generated image 1706 is superimposed on the actual view 1701 for display. Thus, the driver of the own vehicle 301 can see a superimposed display image 1707 from the own vehicle 301. With only an image of a blind spot that is a three dimensional model compressed, the image of the blind spot is reduced in size smaller than the actual view from the own vehicle 301, and is displayed in a wider range. As a result, the safety of a blind spot in a wider area can be confirmed.

FIG. 21 illustrates a case where the range of the wider angle 1705 at the intersection 1700 includes a person 1700a and a vehicle 1700b, whereas the narrower angle 1702 at the intersection 1700 includes only the person 1700a, and does not include the vehicle 1700b. Thus, when the wider angle 1705 is set, each of the image 1706 and the superimposed display image 1707 (image 1707) to the right of FIG. 21 includes both an image corresponding to the person 1700a and an image corresponding to the vehicle 1700b. In contrast, when the narrower angle 1702 is set, each of the image 1703 and the superimposed display image 1704 to the left of FIG. 21 includes not the image corresponding to the vehicle 1700b but the image corresponding to the person 1700a. Thus, only the image of the blind spot is compressed and displayed in the image 1706 to the right of FIG. 21, where both the image corresponding to the person 1700a and the image corresponding to the vehicle 1700b are displayed, and a sufficiently wider blind spot is displayed.

The display unit 108 allocates a pixel color of a blind spot corresponding point to display coordinates according to a value of a depth after the coordinate transformation. The fact that two pairs of display coordinates (X, Y) after the coordinate transformation match shows that one of the objects that correspond to the two pairs of display coordinates (X, Y) and are in the blind spot is seen in the same direction of the other one of the objects with respect to the own vehicle 301. Thus, allocation of a color according to the smallest value of the depth, that is, a color that is the closest to the color of the object can generate a natural image of a blind spot from a viewpoint of the own vehicle.

Figure 17:
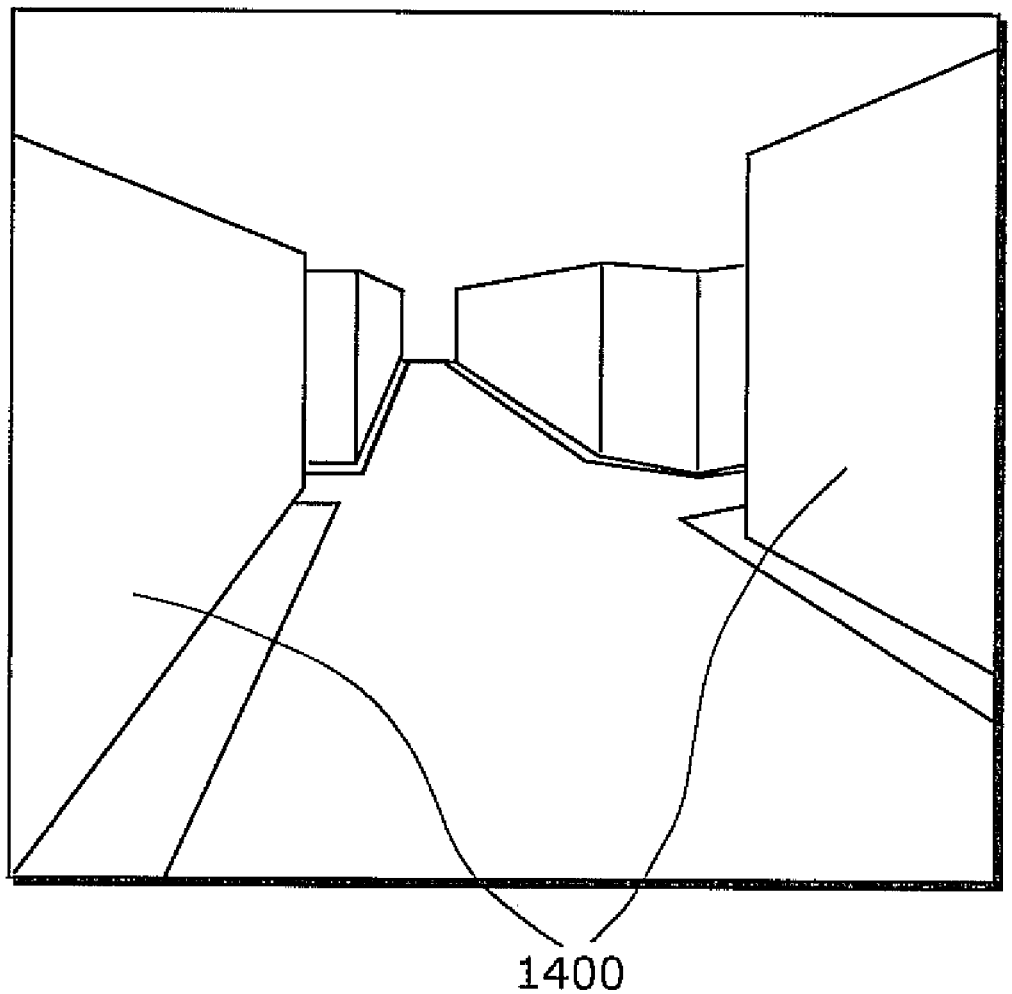
FIG. 17 illustrates an image seen from the own vehicle in a blind spot direction.
Figure 18:
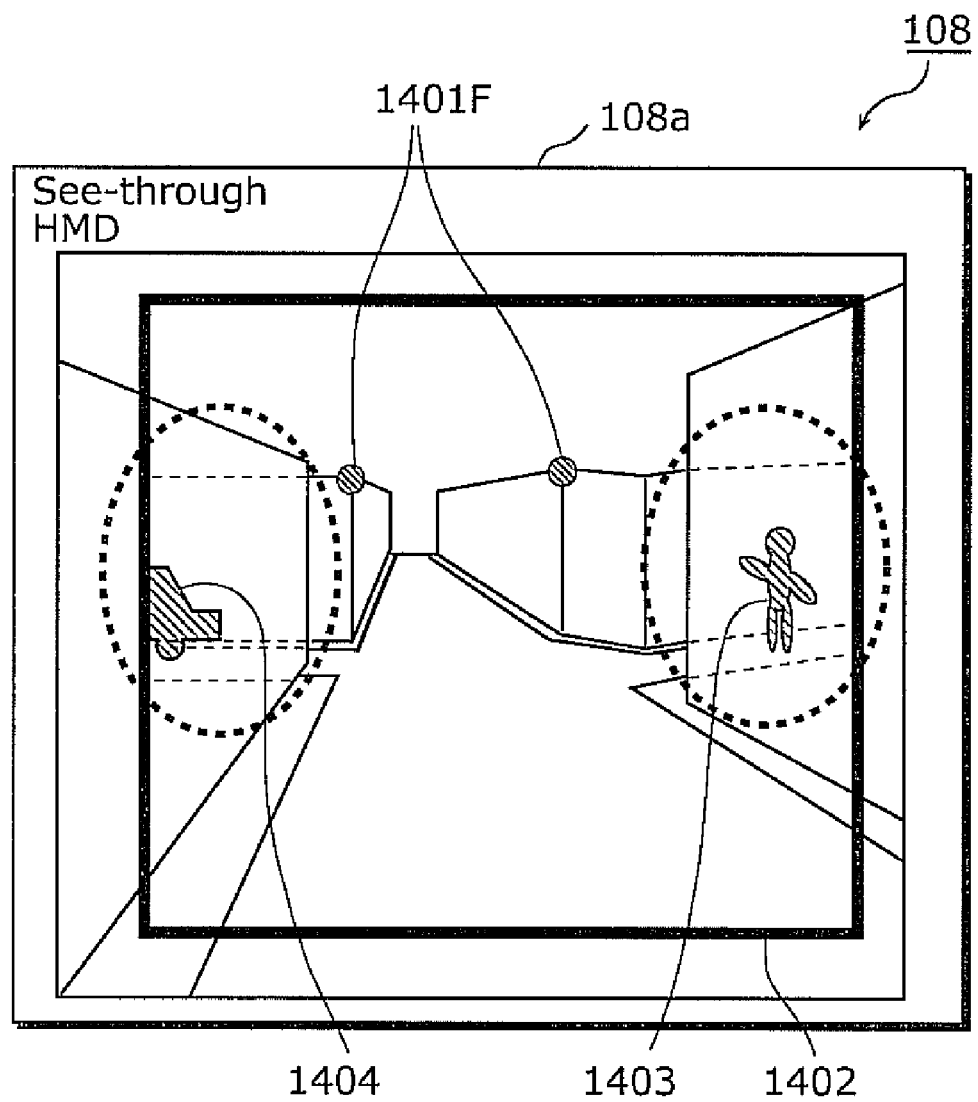
FIG. 18 illustrates an image seen from the own vehicle in a blind spot direction.

FIGS. 17 and 18 illustrate display images from a viewpoint of the driver who drives the own vehicle 301 (FIG. 3 and others) according to Embodiment 1.

FIG. 17 illustrates the normal display mode, where a road wall 1400 blocks the view of the driver while driving, so that a blind spot occurs. FIG. 18 illustrates a display from the viewpoint of the driver according to Embodiment 1, where the driver can see, without any uncomfortable feeling, a vehicle 1404 and a pedestrian 1403 that cannot be seen under ordinary circumstances in a display range 1402.

Here, the display may be an optical see-through HMD, a video see-through HMD, and an opaque display.

FIGS. 17 and 18 exemplify a case using the optical see-through HMD as a display. When a display 108a is a transparent display, such as the optical see-through HMD, the user can see the actual landscape. In this case, the display unit 108 displays, on a display 108a, the images of the pedestrian 1403 and the vehicle 1404 that are objects in respective blind spots by superimposing them on an actual landscape seen by the user, such as the image of the road wall 1400 (see FIG. 17) built along the road on which the own vehicle 301 is driving.

Next, a variation when the display is the video see-through HMD and the opaque display will be described.

Figure 12:
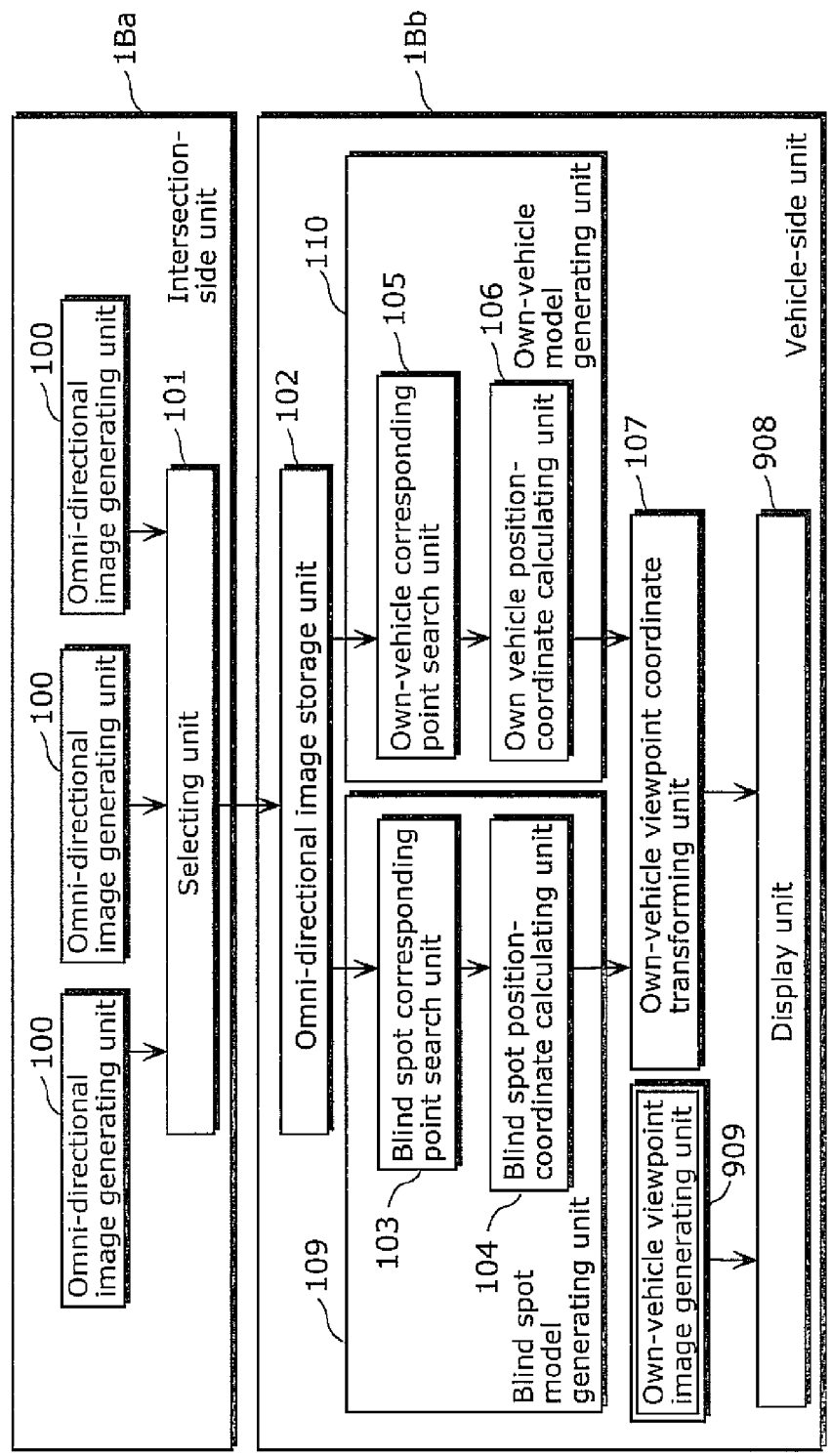
FIG. 12 is a block diagram illustrating a configuration of a blind spot display apparatus additionally including an own-vehicle viewpoint image generating unit according to Embodiment 1.

FIG. 12 illustrates a variation of a blind spot display apparatus 1 B.

When the display 108a is a transparent display allowing for display of an actual landscape, such as the optical see-through HMD, a pixel color is displayed on the display as it is. In contrast, when the display 108a is the video see-through HMD or the opaque display, in the case where a pixel color is displayed on the display as it is, the actual landscape cannot be seen by the user. FIG. 12 is a block diagram illustrating a configuration of the blind spot display apparatus 1 (hereinafter referred to as blind spot display apparatus 1B) additionally including an own-vehicle viewpoint image generating unit 909. As illustrated in FIG. 12, when the own-vehicle viewpoint image generating unit 909 that captures video from the viewpoint of the own vehicle is included in the configuration of Embodiment 1, a display unit 908 may display, on the display, the image of a blind spot in a color obtained by semi-transparently superimposing (i) the pixel color at a blind spot corresponding point to be allocated to the display coordinates on (ii) the pixel color corresponding to the display coordinates in the image generated by the own-vehicle viewpoint image generating unit 909. An example of the own-vehicle viewpoint image generating unit 909 is a camera that is installed in the own vehicle 301 and that captures the front view of the own vehicle 301. In other words, the pixel color of the object in the blind spot generated through the coordinate transformation is semi-transparently superimposed over the video of the front view captured by the camera of the own vehicle 301. Thereby, the driver can intuitively recognize the situation of an intersection having a blind spot and the situation of an area that cannot be seen by the blind spot at a glance.

Figure 23:
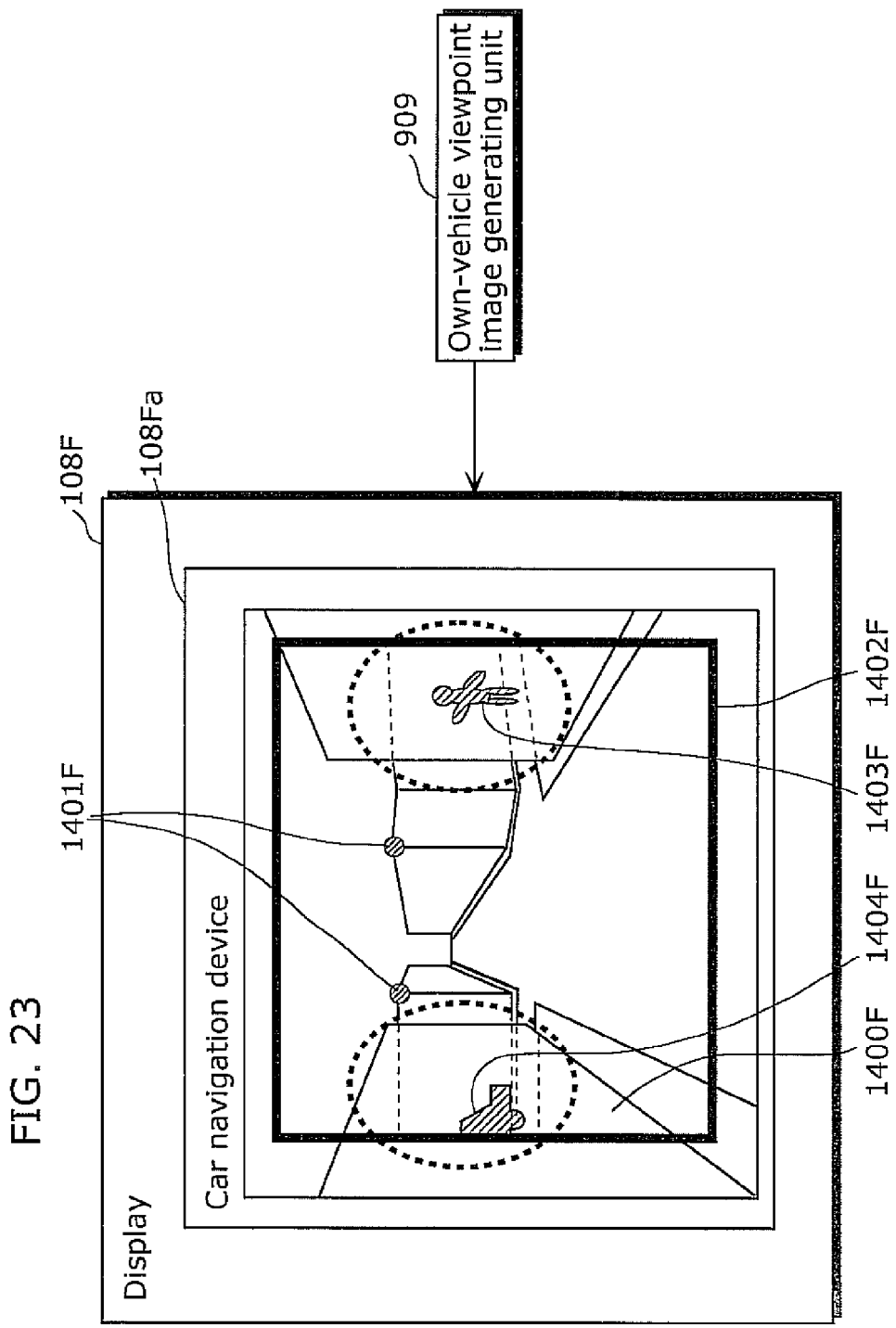
FIG. 23 illustrates a display and own-vehicle viewpoint image generating units.

FIG. 23 illustrates a display screen image 1402F displayed on a display 108Fa that is a video see-through HMD or an opaque display. Here, the display unit 908 displays, on the display 108Fa, video captured by the own-vehicle viewpoint image generating unit 909 from the viewpoint of the own vehicle (FIGS. 17 and 18) as well as a pedestrian 1403F and a vehicle 1404F that are objects in respective blind spots. FIG. 23 illustrates a wall 1400F and image generating units 1401F that are portions of the video captured by the own-vehicle viewpoint image generating unit 909 and displayed by the display unit 908. In such a manner, the display unit 908 displays, on the display 108Fa, the image of the wall 1400F captured by the own-vehicle viewpoint image generating unit 909 as well as the images of the pedestrian 1403F and the vehicle 1404F that are the objects in the respective blind spots. Thereby, the driver can accurately and reliably recognize an object, such as the pedestrian 1403F to be displayed, achieving higher level of safety.

In addition, the opaque display may be a display displayed on an automobile windshield of the own vehicle 301.

Furthermore, with the configuration additionally including the own-vehicle viewpoint image generating unit 909 to Embodiment 1 (FIG. 12), the display unit 908 may change the transparency of a blind spot according to a distance between the own vehicle 301 and an intersection. In other words, for example, the omni-directional images are searched for the position and area of the own vehicle 301, and the transparency at which the pixel color allocated to the display coordinates of a blind spot corresponding point is semi-transparently superimposed on the pixel color corresponding to the display coordinates in the image generated by the own-vehicle viewpoint image generating unit 909 may be changed according to the size of the area of the own vehicle in the image. Furthermore, with the configuration additionally including the own-vehicle viewpoint image generating unit 909 to Embodiment 1, the display unit 908 may change the transparency of a blind spot according to a distance between the own vehicle 301 and other vehicles, a pedestrian, or an intersection. In other words, the omni-directional images are searched for positions and areas of the pedestrian and other vehicles other than the own vehicle 301, and the transparency at which the pixel color allocated to the display coordinates of a blind spot corresponding point is semi-transparently superimposed on the pixel color corresponding to the display coordinates in the image generated by the own-vehicle viewpoint image generating unit 909 may be changed according to the size of the areas of the other vehicles and the pedestrian in the image.

Figure 24:
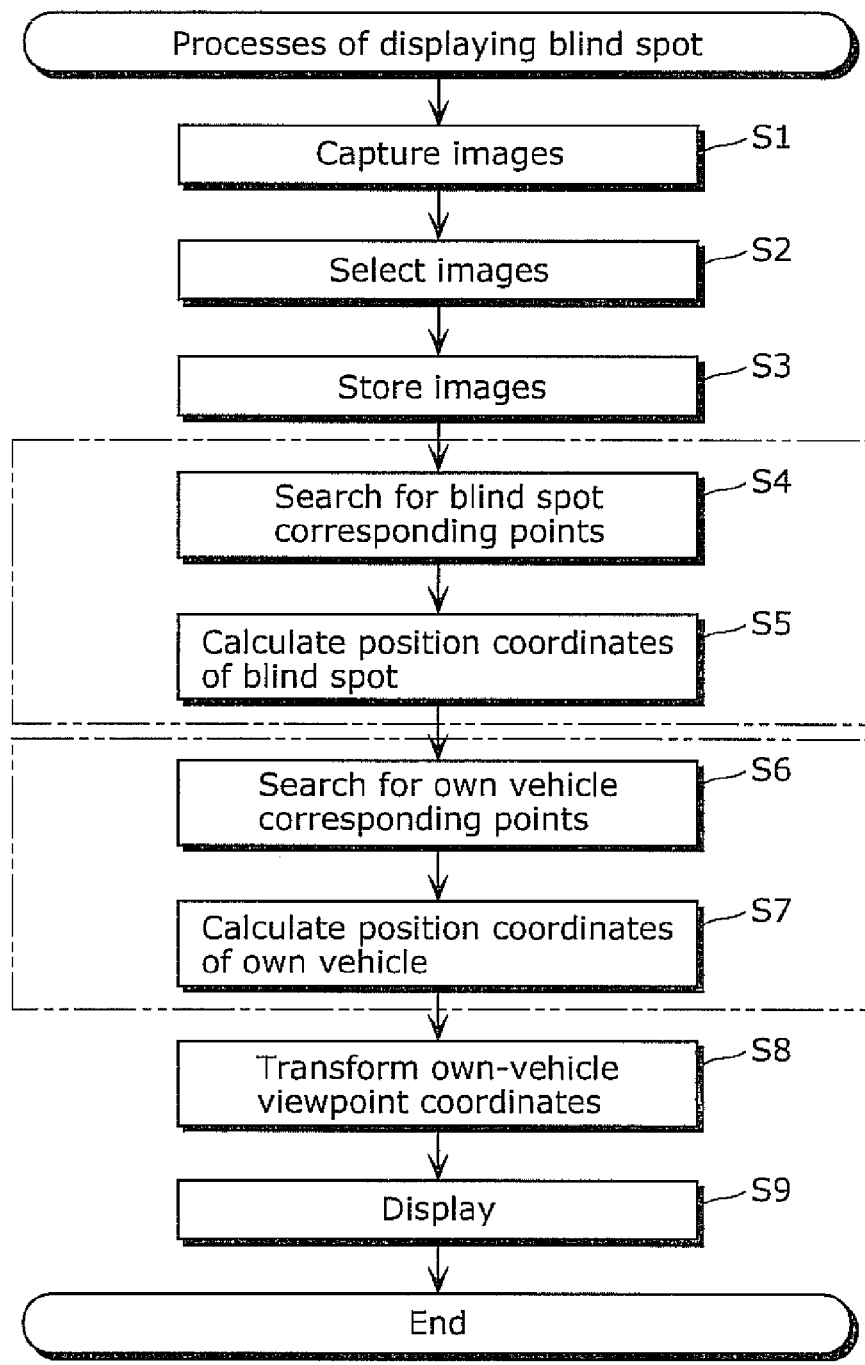
FIG. 24 illustrates a flowchart of processes performed by a blind spot display apparatus.

FIG. 24 shows a flowchart of processes performed by the blind spot display apparatus 1. The blind spot display apparatus 1 executes a blind spot display method indicated by each of the processes in the flowchart. Furthermore, each constituent element of the blind spot display apparatus 1, such as the omni-directional image generating unit 100 and the selecting unit 101, operates according to the order showed by the flowchart. The order of each function and relationships between the functions will be described with reference to the flowchart in FIG. 24.

The omni-directional image generating units 100 respectively capture omni-directional images 201 at different positions in Step S1.

In Step S2, the selecting unit 101 selects corresponding ones of the omni-directional images 201 to be used by the vehicle-side unit 1b, from among the omni-directional images 201 captured by the omni-directional image generating units 100 in Step S1, that is, selects the omni-directional image generating units 100 that capture the corresponding ones of the omni-directional images 201 to be used. Here, the selecting unit 101 selects the omni-directional images 201, that is, selects the omni-directional image generating units 100.

In Step S3, the omni-directional image storage unit 102 obtains the omni-directional images 201 selected by the selecting unit 101 in Step S2, and stores the obtained omni-directional images 201.

In Steps S4 and S5, the blind spot model generating unit 109 calculates three-dimensional position coordinates of an object in a blind spot at an intersection, based on the omni-directional images 201 stored by the omni-directional image storage unit 102 in Step S2. Here, the blind spot model generating unit 109 calculates the three-dimensional position coordinates of the object, based on each image including the object in the omni-directional images 201.

In Step S4, the blind spot corresponding point search unit 103 of the blind spot model generating unit 109 identifies blind spot corresponding points within the omni-directional images (see FIGS. 4 and 5).

In Step S5, the blind spot position-coordinate calculating unit 104 of the blind spot model generating unit 109 calculates the three-dimensional position coordinates of the object having the blind spot corresponding points, based on the blind spot corresponding points identified by the blind spot corresponding point search unit 103 in Step S4 (see FIGS. 6 and 7).

In other words, in the blind spot model generating unit 109, the blind spot corresponding point search unit 103 identifies the blind spot corresponding points (Step S4), and the blind spot position-coordinate calculating unit 104 calculates the three-dimensional position coordinates of the object based on the identified blind spot corresponding points (Step S5).

In Steps S6 and S7, the own-vehicle model generating unit 110 calculates three-dimensional position coordinates of the own vehicle 301 based on the omni-directional images 201 stored by the omni-directional image storage unit 102. The own-vehicle model generating unit 110 calculates the coordinates based on each image of the own vehicle 301 included in the omni-directional images 201.

In Step S6, the own-vehicle corresponding point search unit 105 of the own-vehicle model generating unit 110 identifies own vehicle corresponding points within the omni-directional images 201 (see FIGS. 8 and 9).

In Step S7, the own vehicle position-coordinate calculating unit 106 of the own-vehicle model generating unit 110 calculates the three-dimensional position coordinates of the own vehicle 301, based on the own vehicle corresponding points identified by the own-vehicle corresponding point search unit 105 in Step S6 (see FIG. 11).

In other words, in the own-vehicle model generating unit 110, the own-vehicle corresponding point search unit 105 identifies the own vehicle corresponding points (Step S6), and the own vehicle position-coordinate calculating unit 106 calculates the three-dimensional position coordinates of the own vehicle 301 based on the identified own vehicle corresponding points.

The execution orders of Steps S6 and S7 do not have to be the orders shown in FIG. 24. In other words, the processes of Steps S6 and S7 do not have to, for example, follow the processes of Steps S4 and S5, and may precede the processes of Steps S4 and S5, that is, executed between Steps S3 and S4. Furthermore, a part of or all of the processes in Steps S6 and S7 may be performed in synchronization with a part of or all of the processes in Steps S4 and S5. For example, the part of the processes in Steps S6 and S7 and others may be performed concurrently and in parallel with the part of the processes in Steps S4 and S5 and others.

In Step S8, the own-vehicle viewpoint coordinate transforming unit 107 transforms the three-dimensional position coordinates of the object calculated by the blind spot model generating unit 109 in Step S5 into display coordinates determined by viewing the object at the three-dimensional coordinate position from the three-dimensional coordinate position of the own vehicle 301 calculated by the own vehicle position-coordinate calculating unit 106 in Step S7. The obtained display coordinates are specifically relative coordinates for identifying the three-dimensional position coordinates of the object relative to the three-dimensional coordinate position of the own vehicle 301.

In Step S9, the display unit 109 displays an image of an object in a blind spot, and displays the images as illustrated in FIGS. 17 and 18 (and FIG. 23) using the display coordinates obtained by the own-vehicle viewpoint coordinate transforming unit 107 in Step S8.

As such, the blind spot display apparatus 1 that is installed in the own vehicle 301 and displays information on a blind spot that cannot be seen from the own vehicle 301 includes: the omni-directional image storage unit 102 that stores the omni-directional images 201 (FIG. 2) captured from different three-dimensional coordinate positions; the blind spot model generating unit 109 (FIGS. 1 and 19) that calculates the three-dimensional position coordinates of an object in a blind spot, based on each image of the object included in the omni-directional images (see each image of an object 401 included in the omni-directional images 402 and 403 in FIG. 4 and each image of the object 507 (FIG. 6) included in the omni-directional images 503 and 504 in FIG. 6; the own-vehicle model generating unit 110 that calculates the three-dimensional position coordinates of the own vehicle 301 based on each image of the own vehicle 301 included in the omni-directional images (see each image of the own vehicle 301 included in the omni-directional images 602 and 603 in FIG. 8, and each image of the own vehicle 301 included in the omni-directional images 803, 804, and 806 in FIG. 11); the own-vehicle viewpoint coordinate transforming unit 107 that transforms the position of the object calculated by the blind spot model generating unit 109 into display coordinates calculated by the own-vehicle model generating unit 110 relative to the position of the own vehicle 301; and the display unit 108 that displays information representing the object using the display coordinates.

As described above, the blind spot display apparatus 1 according to Embodiment 1 of the present invention performs three-dimensional transformation from the omni-directional images generated by two of the omni-directional image generating units to images as if the driver saw a blind spot at an intersection that cannot be seen from the driver under ordinary circumstances, and calculates a driver's viewpoint with higher precision than the precision of a GPS using the omni-directional images, so that the driver can see the situation of the blind spot at the intersection from his/her viewpoint without any uncomfortable feeling.

The blind spot display apparatus 1 calculates the three-dimensional position coordinates of the own vehicle 301 based on the omni-directional images 201 that are used for calculation of the three-dimensional position coordinates of the object at the blind spot, thus achieving the blind spot display apparatus 1 having the simpler configuration in which the omni-directional images 201 are used in plural calculations. Thereby, with the simpler configuration, the driver's viewpoint can be calculated with higher precision, and the driver can see the situation of a blind spot at an intersection from the driver's viewpoint without any uncomfortable feeling.

Embodiment 2

Figure 13:
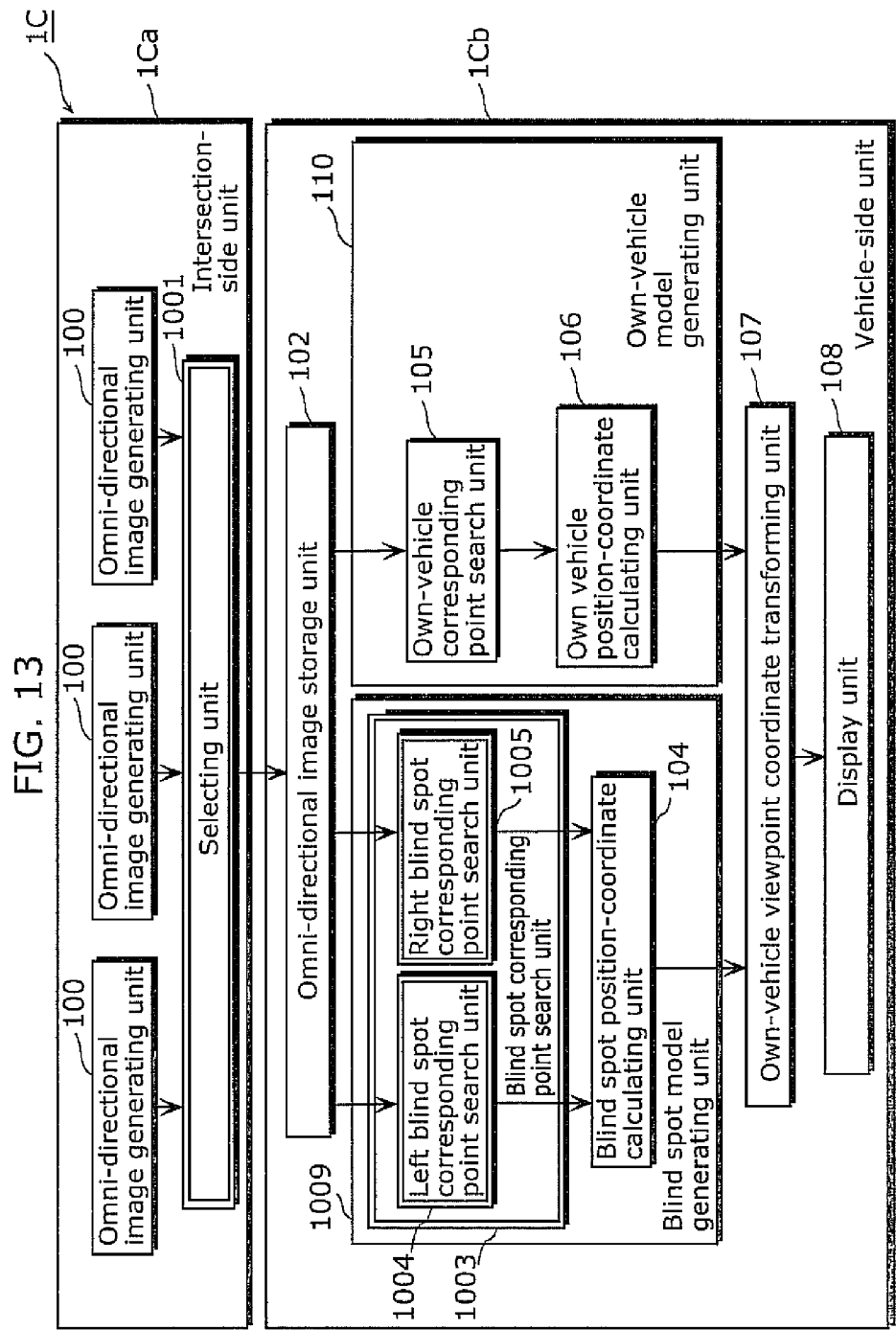
FIG. 13 is a block diagram illustrating a configuration of a blind spot display apparatus according to Embodiment 2.

FIG. 13 is a block diagram illustrating a configuration of a blind spot display apparatus 1C according to Embodiment 2 in the present invention. The blind spot display apparatus 1C includes: an intersection-side unit 1Ca including a selecting unit 1001 at an intersection where omni-directional image generating units 100 each of which obtains an omni-directional image are respectively placed on different three-dimensional position coordinates; and each of the vehicle-side units 1Cb includes an omni-directional image storage unit 102, a blind spot corresponding point search unit 1003 including a left blind spot corresponding point search unit 1004 and a right blind spot corresponding point search unit 1005, a blind spot position-coordinate calculating unit 104, an own-vehicle corresponding point search unit 105, an own vehicle position-coordinate calculating unit 106, an own-vehicle viewpoint coordinate transforming unit 107, and a display unit 108. The omni-directional image generating units 100, the omni-directional image storage unit 102, the blind spot position-coordinate calculating unit 104, the own-vehicle corresponding point search unit 105, the own vehicle position-coordinate calculating unit 106, the own-vehicle viewpoint coordinate transforming unit 107, and the display unit 108 perform the same operations described in Embodiment 1.

The left blind spot corresponding point search unit 1004 that is a constituent element of the blind spot corresponding point search unit 1003 searches two omni-directional images stored in the omni-directional image storage unit 102 or each area of the omni-directional images for the corresponding points in a blind spot to the left of the traveling direction of the own vehicle 301, and identifies the corresponding points as blind spot corresponding points in the images.

The right blind spot corresponding point search unit 1005 that is a constituent element of the blind spot corresponding point search unit 1003 searches two omni-directional images stored in the omni-directional image storage unit 102 or each area of the omni-directional images for the corresponding points in a blind spot to the right of the traveling direction of the own vehicle 301, and identifies the corresponding points as blind spot corresponding points in the images.

The selecting unit 1001 selects two of the omni-directional image generating units 100 at a position where images of the own vehicle 301 and a blind spot that cannot be seen from the own vehicle 301 entering an intersection are simultaneously included in the images from among the omni-directional image generating units that are installed at the intersection, and transfers the two omni-directional images or each area of the omni-directional images to the omni-directional image storage unit 102 via a network.

The two omni-directional images used by the left blind spot corresponding point search unit 1004, the right blind spot corresponding point search unit 1005, and the own-vehicle corresponding point search unit 105 may be two omni-directional images obtained from other sources.

Figure 14:
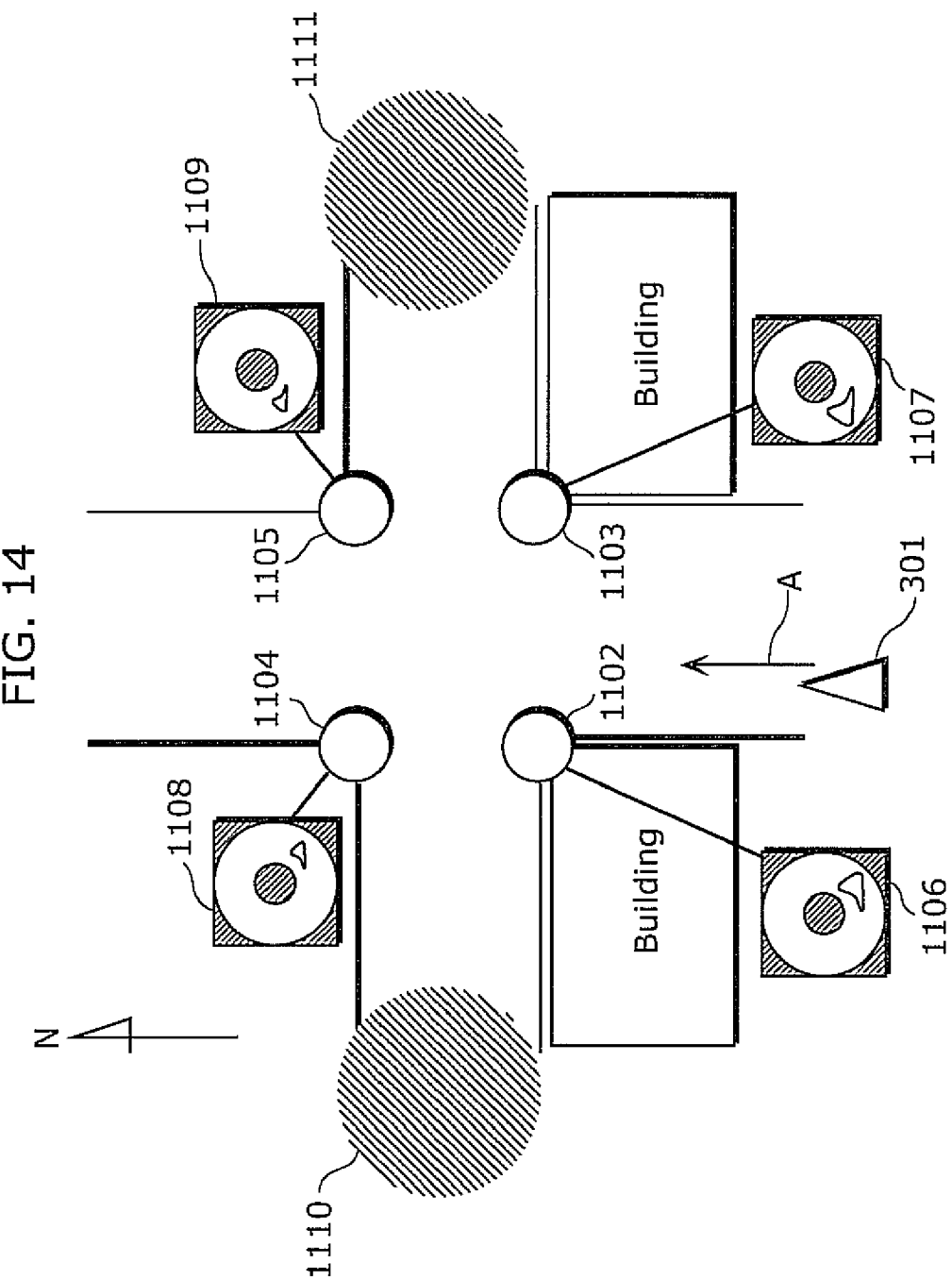
FIG. 14 is a drawing for describing the selecting unit illustrated in FIG. 13.

FIG. 14 is a drawing for describing the selecting unit 1001 illustrated in FIG. 13.

The selecting unit 1001 may select omni-directional image generating units 1102 and 1104 for the left blind spot corresponding point search unit 1004 (FIG. 13), and obtain omni-directional images 1106 and 1108 from the omni-directional image storage unit 102 (FIG. 13). Furthermore, the selecting unit 1001 may select omni-directional image generating units 1103 and 1105 for the right blind spot corresponding point search unit 1005, and obtain omni-directional images 1107 and 1109 from the omni-directional image storage unit 102. Furthermore, the selecting unit 1001 may select omni-directional image generating units 1102 and 1103 for the own-vehicle corresponding point search unit 105, and obtain omni-directional images 1106 and 1107 from the omni-directional image storage unit 102.

When a blind spot (intersection blind spots 1110 and 1111) is distant with respect to the center of an intersection, the precision for searching for, for example, a corresponding point of the intersection blind spot 1110 to the left of the own vehicle 301 using the omni-directional image generating units 1102 and 1104 that are closer to the intersection blind spot 1110 becomes higher than the precision for the search using the omni-directional image generating units 1102 and 1103, thus finally enabling generation of an image with less distortion. This is because the omni-directional image generating unit 1104 captures a larger image including an image of a blind spot to the left of the own vehicle 301 than the image captured by the omni-directional image generating unit 1103. Similarly, the precision of searching for a corresponding point of the intersection blind spot 1111 to the right of the own vehicle 301 becomes the highest when the omni-directional image generating units 1103 and 1105 are selected for the search. In other words, the selecting unit 1001 may select two omni-directional image generating units to the left of a traveling direction A of the own vehicle for the left blind spot corresponding point search unit 1004 that searches for a left blind spot that is distant from an intersection, and select two omni-directional image generating units to the right of the traveling direction A of the own vehicle for the right blind spot corresponding point search unit 1005 that searches for a right blind spot that is distant from the intersection.

As described above, the blind spot display apparatus 1C according to Embodiment 2 of the present invention performs the three-dimensional transformation from images of the right and left intersection blind spots from among the intersection blind spots that cannot be seen from the driver under ordinary circumstances with respect to the traveling direction A of the own vehicle, to the driver's viewpoint images using two omni-directional images that are different from each other, and calculates a driver's viewpoint with higher precision than the precision of a GPS using the omni-directional images, so that the driver's viewpoint images with less distortion can be generated, and the driver can see the situation of the blind spot at the intersection from his/her viewpoint without any uncomfortable feeling.

In the blind spot display apparatus 1C, the omni-directional images with less distortion can be used by the vehicle-side unit 1Cb.

The intersection blind spot 1110 to the left of the own vehicle 301 is a blind spot when the own vehicle 301 turns left at the intersection. Furthermore, the intersection blind spot 1111 to the right of the own vehicle 301 is a blind spot when the own vehicle 301 turns right at the intersection.

Embodiment 3

Figure 15:
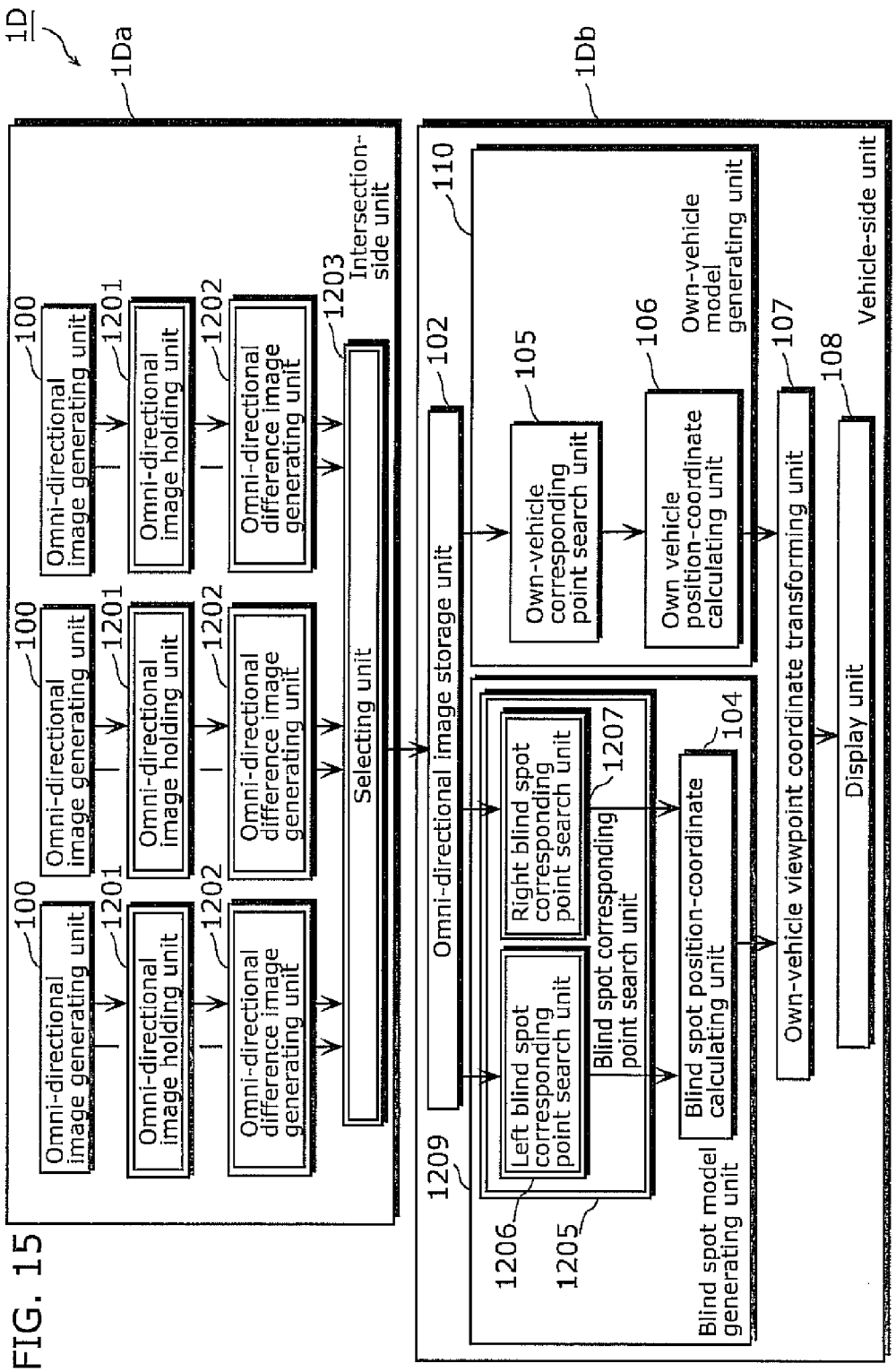
FIG. 15 is a block diagram illustrating a configuration of a blind spot display apparatus according to Embodiment 3.

FIG. 15 illustrates a block diagram of a configuration of a blind spot display apparatus 1D according to Embodiment 3 of the present invention. The blind spot display apparatus 1D includes: an intersection-side unit 1Da including omni-directional image holding units 1201, omni-directional difference image generating units 1202, and a selecting unit 1203 at an intersection where omni-directional image generating units 100 each of which obtains an omni-directional image are respectively placed on different three-dimensional position coordinates; and each of vehicle-side units 1Db including an omni-directional image storage unit 102, a blind spot corresponding point search unit 1205 including a left blind spot corresponding point search unit 1206 and a right blind spot corresponding point search unit 1207, a blind spot position-coordinate calculating unit 104, an own-vehicle corresponding point search unit 105, an own vehicle position-coordinate calculating unit 106, an own-vehicle viewpoint coordinate transforming unit 107, and a display unit 108. The omni-directional image generating units 100, the omni-directional image storage unit 102, the blind spot position-coordinate calculating unit 104, the own-vehicle corresponding point search unit 105, the own vehicle position-coordinate calculating unit 106, the own-vehicle viewpoint coordinate transforming unit 107, and the display unit 108 perform the same operations described in Embodiment 1.

The omni-directional image holding units 1201 hold omni-directional images generated by the omni-directional image generating units 100, respectively. Each of the omni-directional image holding units 1201 does not have a particular limitation on the timing of holding the images. In other words, the omni-directional image holding units 1201 update the images at any timing regardless of each time the omni-directional image generating units 100 generate the omni-directional images, or only when the blind spot display apparatus 1D in the present invention is employed.

Each of the omni-directional difference image generating units 1202 generates a difference image between an omni-directional image held by a corresponding one of the omni-directional image holding units 1201 and an omni-directional image generated by a corresponding one of the omni-directional image generating units 100. When the omni-directional image holding units 1201 hold omni-directional images including no image of a mobile object, the difference image can be used to detect the presence of the moving object and the moving velocity of the mobile object.

The selecting unit 1203 detects a mobile object, such as a pedestrian and a vehicle other than the own vehicle 301 from the difference image generated by each of the omni-directional difference image generating unit 1202, and determines whether or not to transfer the selected two omni-directional images or each area of the omni-directional images to the omni-directional image storage unit 102 based on a result of the detection as Embodiment 1. For example, the selecting unit 1203 may transfer the images only when detecting a mobile object other than the own vehicle 301. Furthermore, the selecting unit 1203 may transfer the images when a mobile object other than the own vehicle 301 is detected and the mobile object moves at a velocity equal to or higher than a predetermined velocity. Furthermore, when detecting the mobile object other than the own vehicle 301, the selecting unit 1203 determines an intersection blind spot with respect to a traveling direction of the mobile object to the intersection (the intersection blind spots 1110 and 1111 in FIG. 14). When the mobile object is to enter the intersection from the left of the traveling direction of the own vehicle 301, only the left blind spot corresponding point search unit 1206 and the own vehicle corresponding point search unit 105 may obtain the omni-directional images from the omni-directional image storage unit 102. In contrast, when the mobile object is to enter the intersection from the right of the traveling direction of the own vehicle 301, only the right blind spot corresponding point search unit 1207 and the own vehicle corresponding point search unit 105 may obtain the omni-directional images from the omni-directional image storage unit 102.

As described above, only in the case where there is a danger that a mobile object is present around an intersection and enters the intersection at high velocity, the blind spot display apparatus 1D according to Embodiment 3 in the present invention performs the three-dimensional transformation from an image of an intersection blind spot that cannot be seen from the driver under ordinary circumstances to a driver's viewpoint image using two omni-directional images and the difference images for detecting the mobile object other than the own vehicle 301, and calculates the driver's viewpoint with higher precision than the precision of a GPS using the omni-directional images, so that the driver can see the situation of the blind spot at the intersection from his/her viewpoint without any uncomfortable feeling and intuitively be informed of the danger.

Embodiment 4

Figure 16:
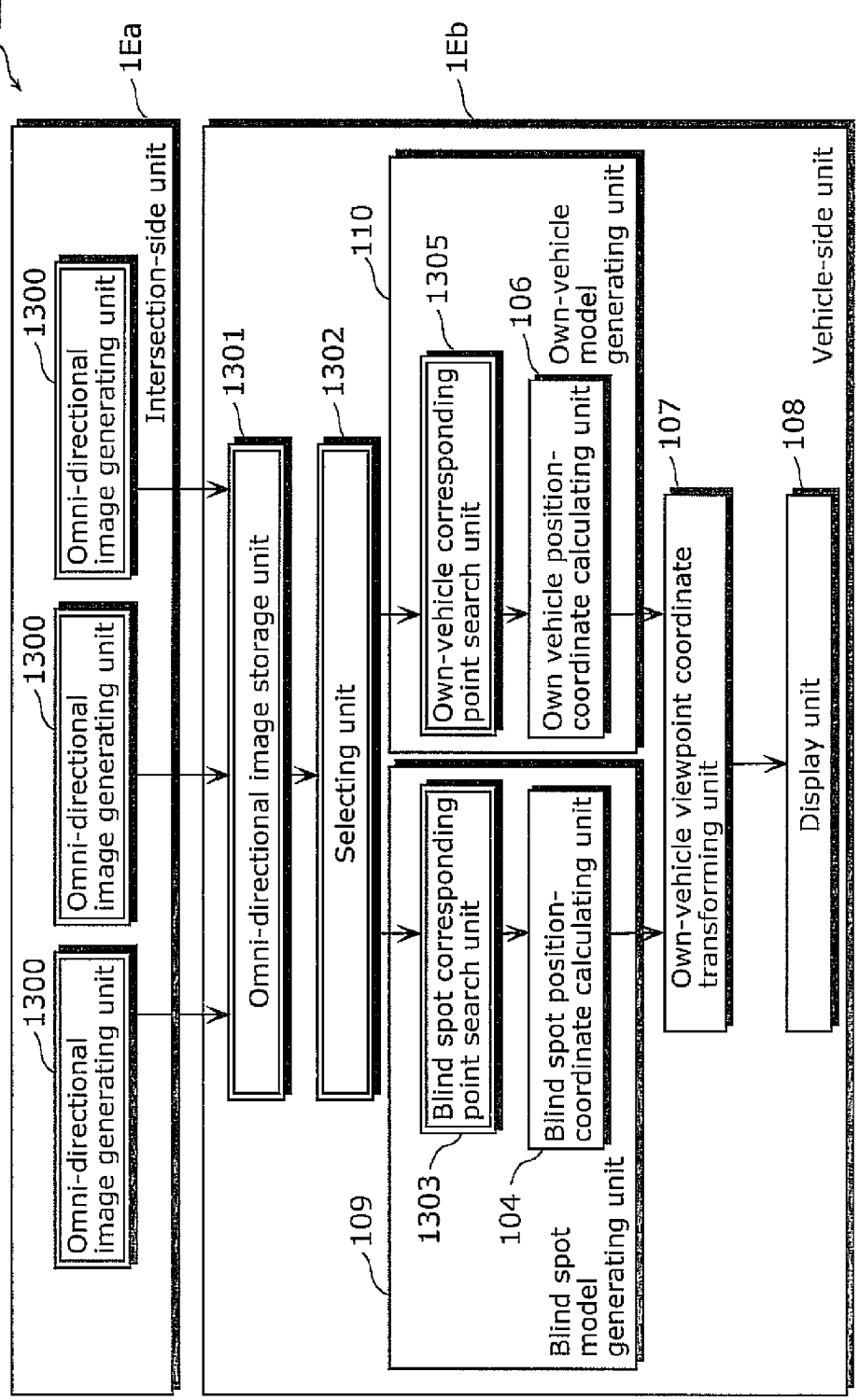
FIG. 16 is a block diagram illustrating a configuration of a blind spot display apparatus according to Embodiment 4.
Figure 20:
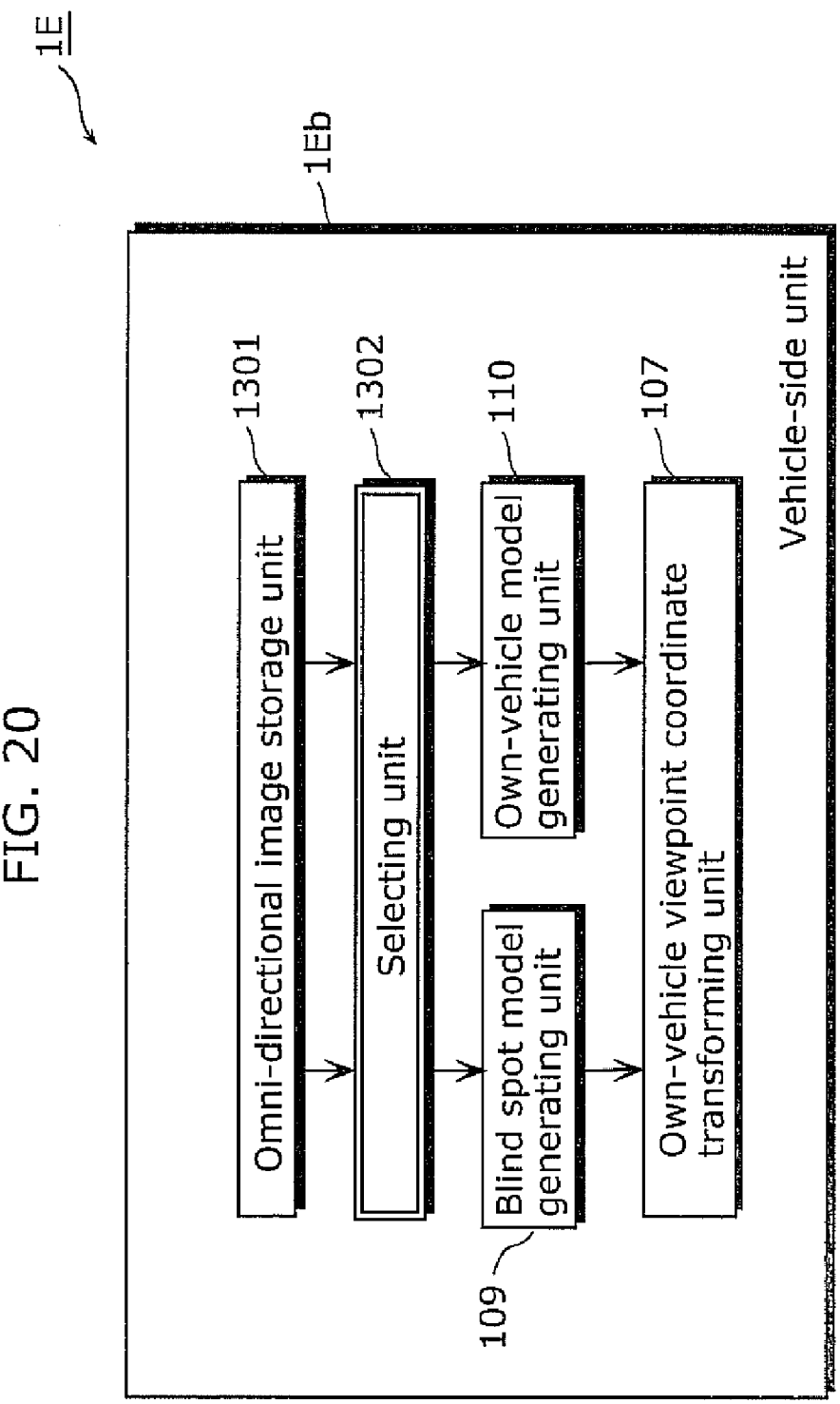
FIG. 20 is a block diagram illustrating a configuration of a vehicle-side unit of a blind spot display apparatus.

FIG. 16 is a block diagram illustrating a configuration of a blind spot display apparatus 1E according to Embodiment 4 in the present invention. The blind spot display device 1E includes: omni-directional image generating units 1300, at an intersection, which obtain omni-directional images and are placed on different three-dimensional position coordinates, respectively; and each intersection-side unit 1Eb including an omni-directional image storage unit 1301, a selecting unit 1302, a blind spot corresponding point search unit 1303, a blind spot position-coordinate calculating unit 104, an own-vehicle corresponding point search unit 1305, an own vehicle position-coordinate calculating unit 106, an own-vehicle viewpoint coordinate transforming unit 107, and a display unit 108 (see FIG. 20). The blind spot position-coordinate calculating unit 104, the own vehicle position-coordinate calculating unit 106, the own-vehicle viewpoint coordinate transforming unit 107, and the display unit 108 perform the same operations described in Embodiment 1.

Each of the omni-directional image generating units 1300 generates an omni-directional image with respect to the placed three-dimensional position coordinates, and transfers the omni-directional image to the omni-directional image storage unit 1301 via a network.

The omni-directional image storage unit 1301 stores the omni-directional images transmitted via the network, and transfers the omni-directional images to the selecting unit 1302 as necessary.

The selecting unit 1302 selects two of the omni-directional image generating units 1300 at a position where images of the own vehicle 301 and a blind spot that cannot be seen from the own vehicle 301 entering an intersection are simultaneously included in the images from among the omni-directional image generating units 1300 that are installed at the intersection, and transfers, to the blind spot corresponding point search unit 1303 and the own-vehicle corresponding point search unit 1305, images captured by the selected omni-directional image generating units.

The blind spot corresponding point search unit 1303 searches the omni-directional images generated by two of the omni-directional image generating units selected by the selecting unit 101 for the images of the same object in the blind spot included therein, and determines blind spot corresponding points on the images of the object.

The own-vehicle corresponding point search unit 1305 searches the omni-directional images generated by the two omni-directional image generating units 1300 selected by the selecting unit 1302 for the images of the own vehicle 301, and determines own vehicle corresponding points on the images of the own vehicle 301.

As described above, the blind spot display apparatus 1E according to Embodiment 4 in the present invention can store, in the vehicle-side unit 1Eb, information on omni-directional images to be used for three-dimensionally generating an image of an intersection blind spot that cannot be seen from the driver under ordinary circumstances, thus reducing the infrastructural cost for installing devices at intersections. The configurations of Embodiments 2 and 3 can be obviously combined with Embodiment 4.

A blind spot display apparatus having the following configuration may be created. Furthermore, each of Embodiments described may be added with a part of or entire configuration to be described below.

(A) A blind spot display apparatus may include: an omni-directional image storage unit that obtains images respectively captured at different positions by image generating units, the images including at least an image of a common area including at least a road in part; an own-vehicle image identifying unit that identifies each image (the pixels P2 and P3 in FIG. 8) including an image of an own vehicle equipped with the blind spot display apparatus, from among the captured images; an object image identifying unit that identifies each image (the blind spot corresponding points 505 and 506 in FIG. 6, the pixels P0 and P1 in FIG. 4) including an image of an object in a blind spot that cannot be seen from the own vehicle, from among the captured images; a locating unit that locates positions of items included in the captured images, based on each image of the items in the captured images; an own-vehicle model generating unit that calculates a position of the own vehicle based on each image including the image of the own vehicle identified by the own-vehicle image identifying unit, using the locating unit; a blind spot model generating unit that calculates a position of the object based on each image including the image of the object identified by the object image identifying unit, using the locating unit; an own-vehicle viewpoint coordinate transforming unit that transforms the position of the object calculated by the blind spot model generating unit into display coordinates calculated by the own-vehicle model generating unit relative to the position of the own vehicle; and a display unit that displays information on the object using the display coordinates.

The own-vehicle image identifying unit may be included in the own-vehicle model generating unit (the own-vehicle model generating unit 110 in each Embodiments described and others). Furthermore, the object image identifying unit may be included in the blind spot model generating unit (the blind spot model generating unit 109 in each Embodiments described and others). Furthermore, the locating unit may include: a first locating unit that is included in the own-vehicle model generating unit and locates the position of the own vehicle; and a second locating unit that is included in the blind spot model generating unit and that locates the position of the object.

The blind spot that cannot be seen from the own vehicle is, for example and more specifically, a blind spot that cannot be seen from the user (driver) inside the own vehicle.

(B) The own-vehicle image identifying unit may include: an own vehicle contour storage unit that stores a contour of the own vehicle; and an identifying unit that identifies an area of the contour, stored by the own vehicle contour storage unit, in the captured image, as the image including the image of the own vehicle.

The own-vehicle image identifying unit may include: a storage unit that stores a correspondence in which a range including a position of the own vehicle is associated with an area in the captured image corresponding to the range; a range information obtaining unit that obtains range information for identifying the range including the position of the own vehicle, by identifying the position of the own vehicle more approximately than the position identified by the locating unit, using a GPS device included in the own vehicle; and an identifying unit that identifies an image in an area of the captured image (or a predetermined portion in the image) associated in the correspondence with the range identified by the range information obtained by the range information obtaining unit, as the image of the own vehicle.

(C) The object image identifying unit may identify, for example, an image of an obstruction making the blind spot that cannot be seen from the own vehicle, by performing image analysis on (i) details of the image including the image of the own vehicle identified by the own-vehicle image identifying unit from among the captured images, and (ii) details of the captured images other than the image including the image of the own vehicle. The object image identifying unit may identify the identified image of the obstruction and the image including the blind spot corresponding to the image including the image of the own vehicle, identify an image of an item included in the identified image including the image of the blind spot, and identify the image of the object included in the captured image.

(D) The object image identifying unit may include a storage unit that stores a correspondence in which a position of the own vehicle is associated with an area in a captured image where a blind spot as seen from the position of the own vehicle appears, and identify an image in the area associated with the position of the own vehicle identified by the own vehicle locating unit through the calculation by the own-vehicle model generating unit, as the image including the image of the object.

Furthermore, the object image identifying unit may include a storage unit that stores a correspondence in which a range including a position of the own vehicle is associated with an area included in a captured image where a blind spot as seen from the position of the own vehicle appears, and identify an image in the area associated in the correspondence with the range identified by range information obtained from a GPS device included in the own vehicle, as the image including the image of the object.

(E) The locating unit may include: a holding unit that holds a correspondence in which a point of each image including an item is associated with a position of the item included in each image at each point; and a processing unit that identifies the position associated in the correspondence with each of the points at which the images of the object identified by the object image identifying unit are included, as the position of the object.

The correspondence in which the points in the captured images are associated with the corresponding positions of the items may include, for example, each position of the image generating units that obtain the captured images each including the image of an item. Here, the processing unit may identify the position at which the image of the item is included as the position of the item included in each of the images, by identifying the position associated in the correspondence, when the captured images are obtained in each of the positions. The correspondence may include each capturing direction in which each of the image generating units captures the image, relative position relationships between the image generating units, and a relative relationship, such as relative angles between the capturing directions.

(F) The display unit may display, to a driver of the own vehicle, an information-added image to which information on the object is added, at a point of the object identified by the display coordinates in the own-vehicle-viewpoint image from the viewpoint of the own vehicle which is captured by a vehicle viewpoint image generating unit. The display unit may display the display coordinates to the user through this display.

Furthermore, the display unit may display information on the object at the point in the actual image seen from the driver of the own vehicle and indicated by the display coordinates, using an actual image drawing unit, such as a hologram and an optical see-through HMD.

The part of or entire configuration described in (A) to (F) may be combined with each of Embodiments, and another Embodiment may be implemented. Furthermore, only a part of the elements included in the own-vehicle image identifying unit, for example, a part of the functions of the own-vehicle image identifying unit may be added to each of Embodiments.

The following description will be continued. The details already described will be accordingly omitted.

Figure 25:
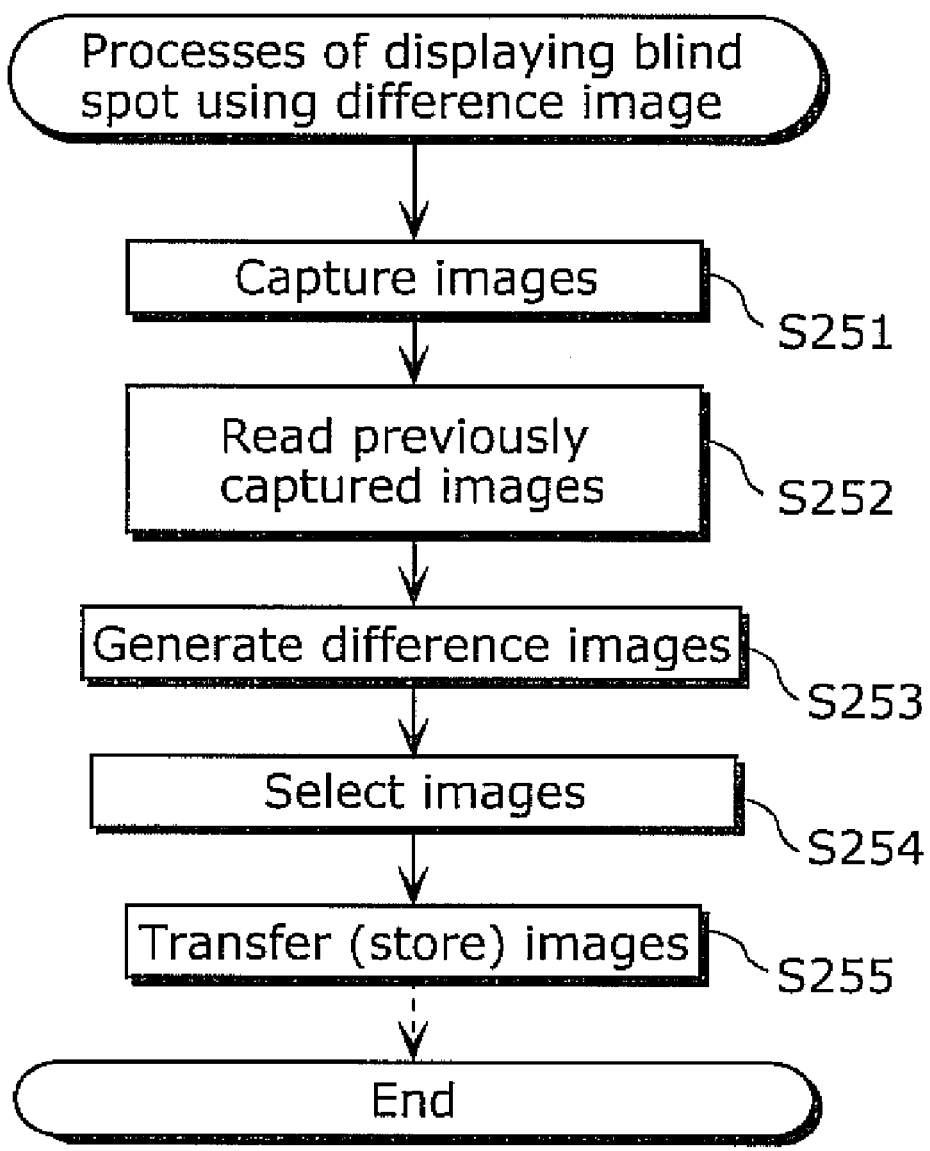
FIG. 25 illustrates a flowchart of processes performed by the blind spot display apparatus illustrated in FIG. 10 (blind spot display apparatus illustrated in FIG. 15).

FIG. 25 illustrates a flowchart of processes performed by the blind spot display apparatus 1A in FIG. 10 (the blind spot display apparatus 1D in FIG. 15) that processes a difference image.

As described above, the blind spot display apparatus 1A includes the omni-directional image holding units 701 (the omni-directional image holding units 1201 in FIG. 15), the omni-directional difference image generating units 702 (the omni-directional difference image generating units 1202 in FIG. 15), and the selecting unit 101.

Then, each of the omni-directional image holding units 701 holds an omni-directional image on which background subtraction is performed and which is captured by a corresponding one of the omni-directional image generating units 100.

Then, each of the omni-directional difference image generating units 702 performs background subtraction on the omni-directional image captured by the corresponding one of the omni-directional image generating units 100 and on the omni-directional image held by a corresponding one of the omni-directional image holding units 701. In other words, each of the omni-directional difference image generating units 702 generates a difference image between the omni-directional image held by a corresponding one of the omni-directional image holding units 701 and the captured omni-directional image.

Then, the selecting unit 101 selects each image to be processed by the blind spot model generating unit 109 from each of the difference images generated by the omni-directional difference image generating units 702. Furthermore, the selecting unit 101 selects each image to be processed by the own-vehicle model generating unit 110 from each of the difference images generated by the omni-directional difference image generating units 702. The selecting unit 101 transfers, to the vehicle-side unit 1Ab, each of the selected images for the blind spot model generating unit 109 (difference images) and for the own-vehicle model generating unit 110, and stores them in the omni-directional image storage unit 102.

The processes from Steps S251 to S255 correspond to the processes from Steps S1 to S3 in FIG. 24. Then, the blind spot display apparatus 1A performs the same processes as Steps S4 to S9 in FIG. 24 after the processes of Steps S251 to S255 in FIG. 25. FIG. 25 omits the detailed indication after S255.

In Step S251, the omni-directional image generating units 100 capture respective omni-directional images.

In Step S252, each of the omni-directional difference image generating units 702 reads the omni-directional image held by a corresponding one of the omni-directional image holding units 701, from the corresponding one of the omni-directional image holding units 701.

In Step S253, each of the omni-directional difference image generating units 702 generates a difference image between two omni-directional images, that is, (i) the omni-directional image generated by the corresponding one of the omni-directional image generating units 100 in Step S251 and (ii) the omni-directional image read from the corresponding one of the omni-directional image holding units 701 in Step S252.

In Step S254, the selecting unit 101 selects an image from each of the difference images generated in Step S253.

In Step S255, the selecting unit 101 transfers each of the images selected in Step S254 to the vehicle-side unit 1Ab, and stores the transferred images in the omni-directional image storage unit 102.

Figure 26:
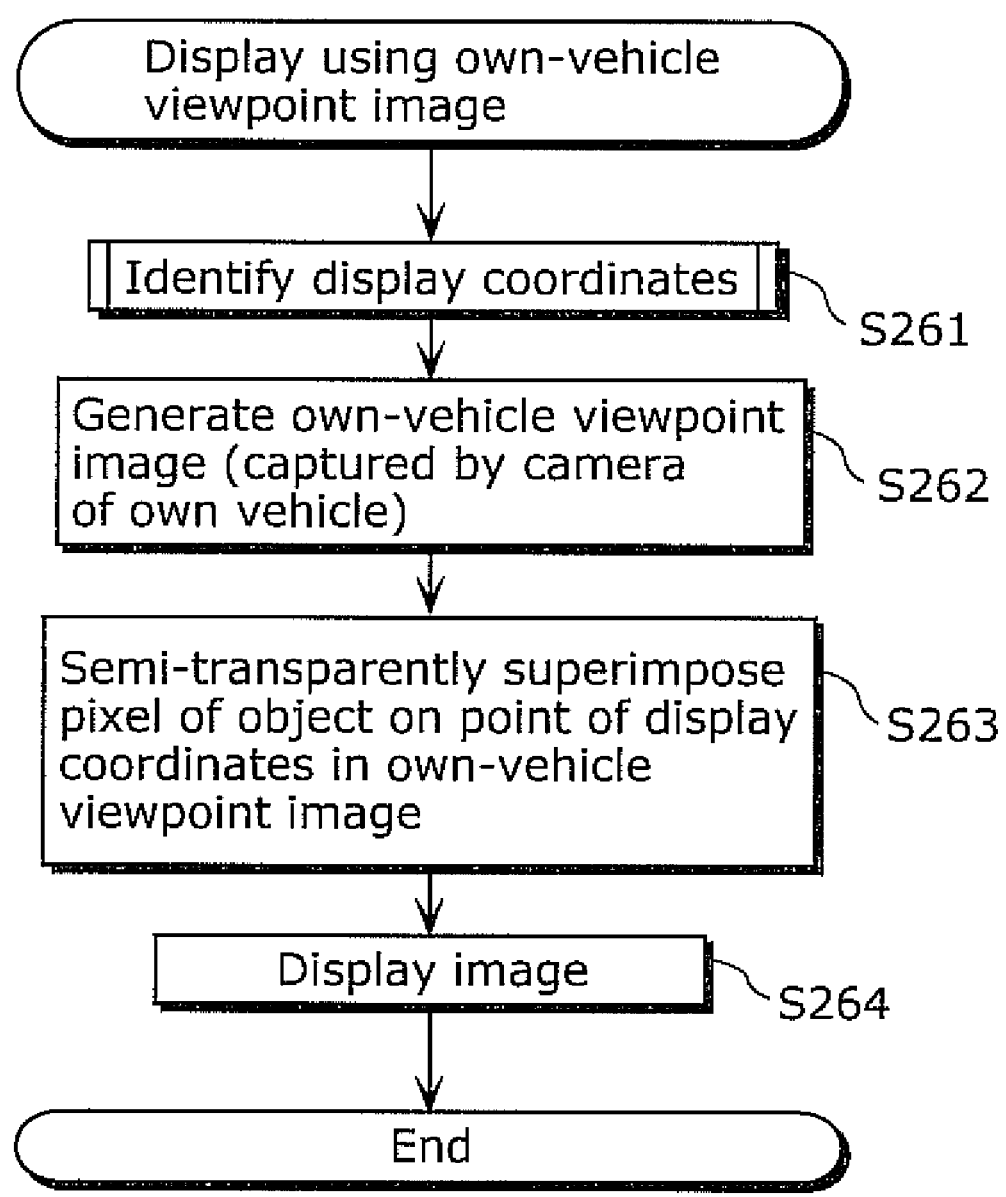
FIG. 26 illustrates a flowchart of processes performed by the blind spot display apparatus illustrated in FIG. 12.

FIG. 26 illustrates a flowchart of processes performed by the blind spot display apparatus 1B in FIG. 12.

As described above, the blind spot display apparatus 1B includes the own-vehicle viewpoint image generating unit 909 and the display unit 908.

Then, the own-vehicle viewpoint image generating unit 909 generates an own-vehicle viewpoint image obtained by viewing, from the own vehicle 301, a position indicated by the display coordinates (see Steps S1 to S8 in FIG. 24) obtained by the own-vehicle viewpoint coordinate transforming unit 107. More specifically, the own-vehicle viewpoint image generating unit 909 is, for example, a camera that captures an image in a direction of the display coordinates from the own vehicle 301. The own-vehicle viewpoint image generating unit 909 may simply capture a front view of the own vehicle 301. In other words, the own-vehicle viewpoint image generating unit 909 may capture the own-vehicle viewpoint image only when the front view of the own vehicle 301 includes display coordinates, and capture simply the front view when the front view of the own vehicle 301 does not include any display coordinates.

Then, the display unit 908 generates an image in which predetermined displays are inserted in the display coordinates calculated by the own-vehicle viewpoint coordinate transforming unit 107 in the own-vehicle viewpoint image generated by the own-vehicle viewpoint image generating unit 909, and displays the generated image. Here, the displays to be inserted therein indicate a position of the object whose corresponding points are identified by the blind spot corresponding point search unit 103 when the display coordinates are calculated. In other words, the displays to be added represent the presence of the object at the position.

FIG. 23 illustrates the display screen image 1402F displayed on the display 108F of the blind spot display apparatus 1B including the own-vehicle viewpoint image generating unit 909 in FIG. 12.

The display unit 108F includes, for example, the display 108Fa on which the display screen image 1402F is displayed. The display 108Fa may be, for example, a liquid crystal display.

The display screen image 1402F includes the pedestrian 1403F, the vehicle 1404F, the wall 1400F, and the image generating units 1401F. The pedestrian 1403F and the vehicle 1404F are respectively inserted displays representing the described objects. In contrast, the wall 1400F and the image generating units 1401F are not the inserted displays but images included in the own-vehicle viewpoint image before the predetermined displays are inserted. In other words, the wall 1400F and others are images having the same details as the images seen actually by the user from the own vehicle 301.

In Step S261 (FIG. 26), the blind spot display apparatus 1B performs the processes from Steps S1 to S8 in FIG. 24 Thereby, the own-vehicle viewpoint coordinate transforming unit 107 included in the blind spot display apparatus 1B calculates display coordinates of an object.

In Step S262, the own-vehicle viewpoint image generating unit 909 generates an own-vehicle viewpoint image.

In Step S263, the display unit 108F inserts a display of an object in the display coordinates calculated in Step S261 on an own-vehicle viewpoint image generated in Step S262.

In Step S264, the display unit 108F displays, on the display 108Fa, an image in which the display of the object has been inserted in Step S263.

Figure 27:
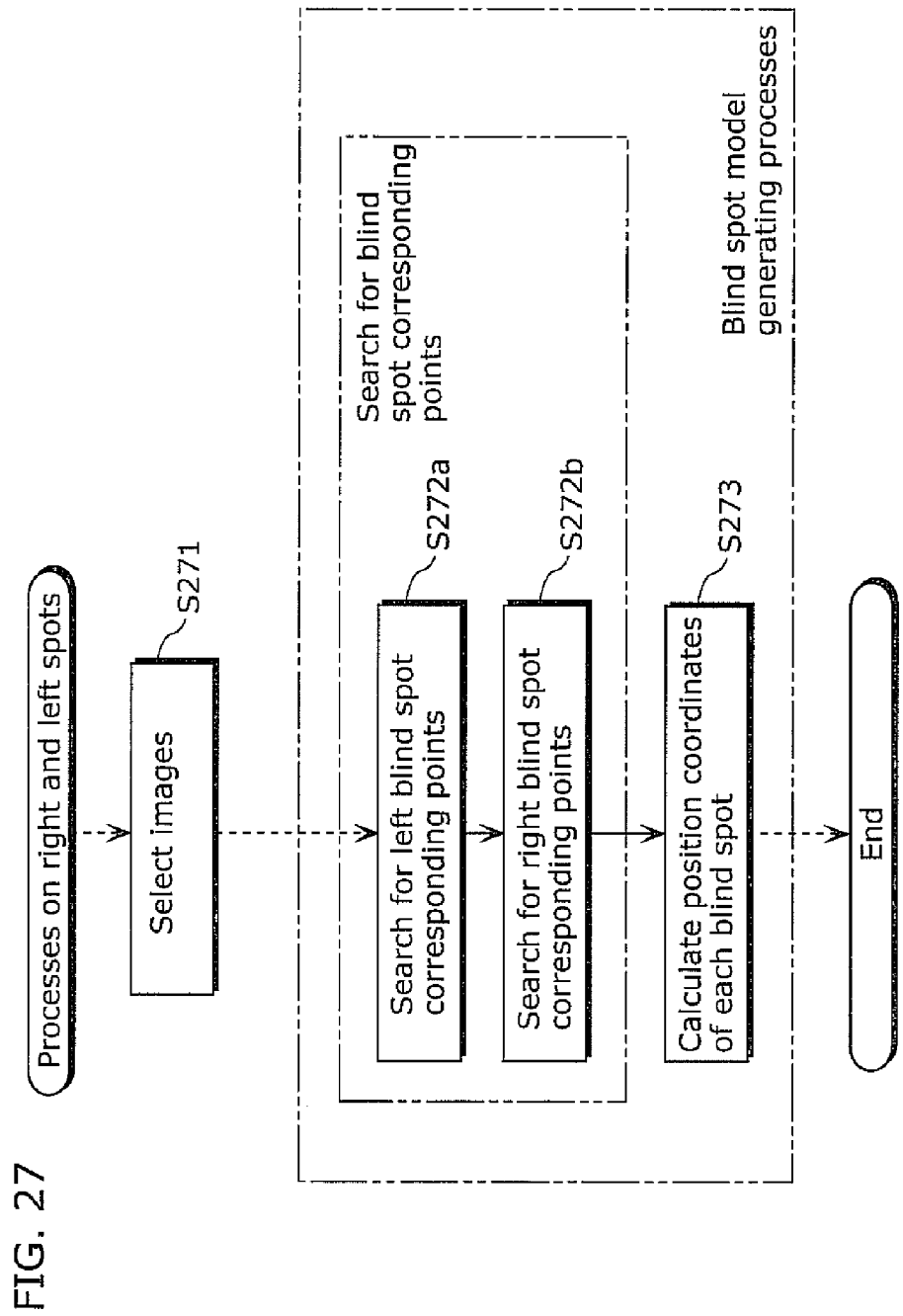
FIG. 27 illustrates a flowchart of processes performed by the blind spot display apparatus illustrated in FIG. 13.

FIG. 27 illustrates a flowchart of processes of the blind spot corresponding point search unit 1003 included in the blind spot display apparatus 1C in FIG. 13 (the blind spot display apparatus 1D in FIG. 15), where the blind spot corresponding point search unit 1003 includes two different units that supports a left blind spot and a right blind spot, respectively.

As described above, the blind spot display apparatus 1C includes the selecting unit 1001 (the selecting unit 1203) and the blind spot corresponding point search unit 1003 (the blind spot corresponding point search unit 1205). Furthermore, the blind spot corresponding point search unit 1003 includes the left blind spot corresponding point search unit 1004 (the left blind spot corresponding point search unit 1206) and the right blind spot corresponding point search unit 1005 (the right blind spot corresponding point search unit 1207).

The selecting unit 1001 selects each omni-directional image appropriate for the processes on an image of an object in a blind spot (the intersection blind spot 1110 in FIG. 14) to the left of a traveling direction of the own vehicle 301, that is, the blind spot present in viewing the traveling direction from the own vehicle 301, and stores each of the selected omni-directional images in the omni-directional image storage unit 102. Furthermore, the selecting unit 1001 also selects each omni-directional image appropriate for the processes on an object in a blind spot to the right of a traveling direction, and stores each of the selected omni-directional images in the omni-directional image storage unit 102.

The left blind spot corresponding point search unit 1004 obtains each of the omni-directional images of a left blind spot (the intersection blind spot 1110 to the left in FIG. 14) selected by the selecting unit 1001, from the omni-directional image storage unit 102. Then, the left blind spot corresponding point search unit 1004 identifies a blind spot corresponding point of each of the obtained omni-directional images of the left blind spot.

The right blind spot corresponding point search unit 1005 obtains each of the omni-directional images of the right blind spot, and identifies a blind spot corresponding point of each of the obtained omni-directional images of the right blind spot.

In such a manner, the blind spot corresponding point search unit 1003 identifies the blind spot corresponding points of the right and left blind spots through the left blind spot corresponding point search unit 1004 and the right blind spot corresponding point search unit 1005.

The blind spot position-coordinate calculating unit 104 performs operations based on the identified blind spot corresponding points of the right and left blind spots.

Step S271 (FIG. 27), Step S272a, Step S272b, and Step S273 are performed in Step S2, Step S4, and Step S5 in FIG. 24. The blind spot display apparatus 1C also performs the same processes as Steps S1, S3, and others in FIG. 24 to perform the processes in FIG. 27. FIG. 27 omits the processes corresponding to these steps including Step S1.

In Step S271, the selecting unit 1001 selects the omni-directional images of the left blind spot and the omni-directional images of the right blind spot, from among the omni-directional images captured in the process corresponding to Step S1 in FIG. 1, and stores the selected omni-directional images in the omni-directional image storage unit 102.

In Step S272a, the left blind spot corresponding point search unit 1004 obtains the omni-directional images of the left blind spot selected in Step S271 from the omni-directional image storage unit 102. Then, the left blind spot corresponding point search unit 1004 identifies a blind spot corresponding point of each of the obtained omni-directional images of the left blind spot.

In Step S272b, the right blind spot corresponding point search unit 1005 obtains the omni-directional images of the right blind spot selected in Step S271 from the omni-directional image storage unit 102, and identifies a blind spot corresponding point of each of the obtained omni-directional images of the right blind spot.

In Step S273, the blind spot position-coordinate calculating unit 104 calculates three-dimensional position coordinates of each object in the right and left blind spots from the identified blind spot corresponding points identified in Step S272a and Step S272b.

Figure 28:
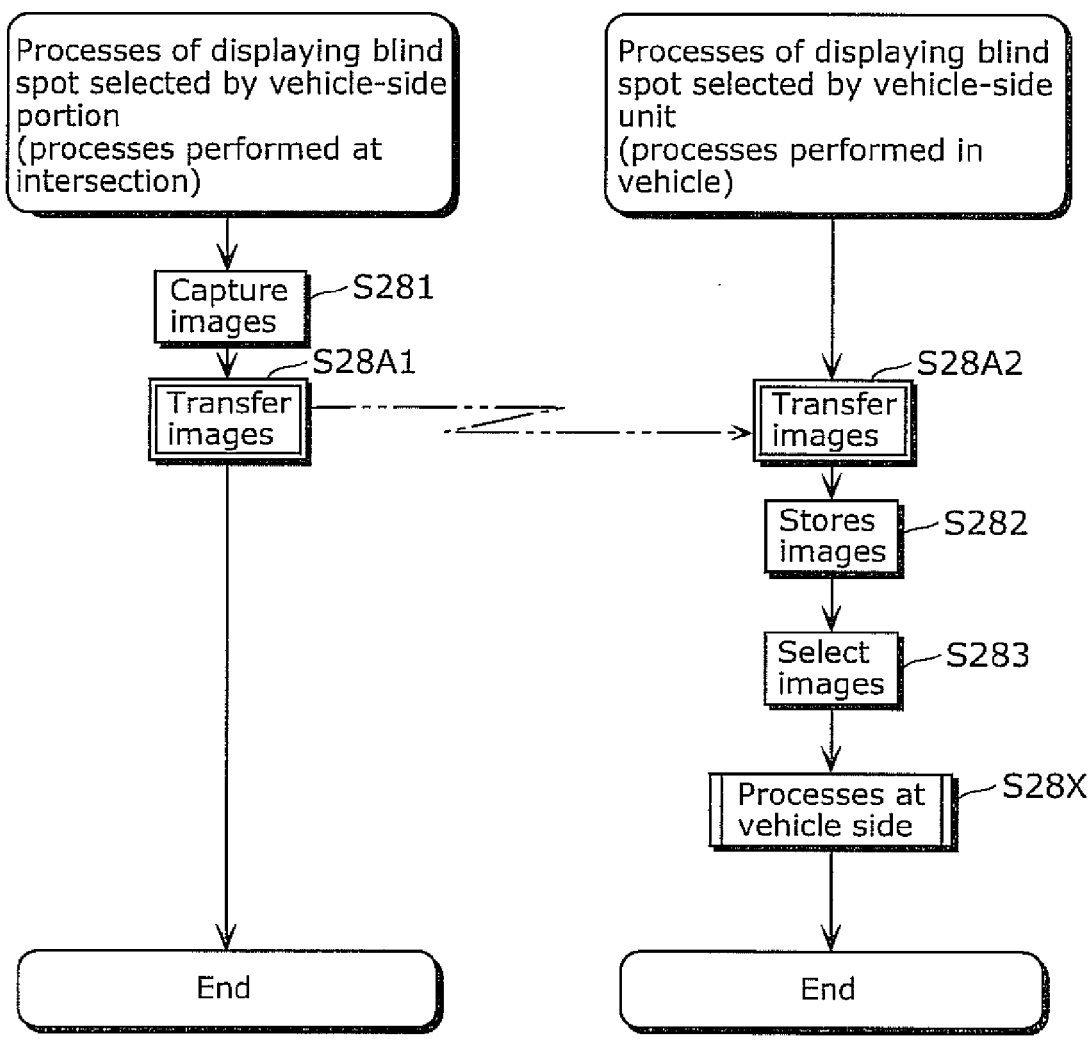
FIG. 28 illustrates flowcharts of processes performed by the blind spot display apparatus illustrated in FIG. 16.

FIG. 28 illustrates flowcharts of processes performed by the blind spot display apparatus 1E including the selecting unit 1302 in the vehicle-side unit 1Eb in FIG. 16.

As described above, the blind spot display apparatus 1E includes the omni-directional image storage unit 1301 and the selecting unit 1302.

The omni-directional image generating units 1300 respectively store the captured omni-directional images in the omni-directional image storage unit 1301 included in the vehicle-side unit 1Eb.

Then, the selecting unit 1302 selects each of the omni-directional images to be used by the blind spot model generating unit 109 from the omni-directional images stored in the omni-directional image storage unit 1301. Then, the selecting unit 1302 selects each of the omni-directional images to be used by the own-vehicle model generating unit 110 from the omni-directional images stored in the omni-directional image storage unit 1301.

The blind spot model generating unit 109 performs processes based on each of the omni-directional images selected for the blind spot model generating unit 109 by the selecting unit 1302.

The own-vehicle model generating unit 110 also performs processes based on each of the omni-directional images selected for the own-vehicle model generating unit 110 by the selecting unit 1302.

In Step S281 (FIG. 28), the omni-directional image generating units 1300 in the intersection-side unit 1Ea capture respective omni-directional images (see left section in FIG. 28).

In Step S28A1, the omni-directional image generating units 1300 respectively store the captured omni-directional images generated in Step S281 in the omni-directional image storage unit 1301 included in the vehicle-side unit 1Eb.

In Step S28A2, the omni-directional image storage unit 1301 in the vehicle-side unit 1Eb obtains each of the omni-directional images stored in Step S28A1 by the omni-directional image generating units 1300 in the intersection-side unit 1Ea, from the omni-directional image generating units 1300, respectively (see right section in FIG. 28).

In Step S282, the omni-directional image storage unit 1301 stores each of the omni-directional images obtained in Step S28A2.

In Step S283, the selecting unit 1302 selects some of the omni-directional images stored in Step S282.

In Step S28X, the blind spot display apparatus 1E performs the processes from Steps S4 to S9 in FIG. 24 based on a result of the selection in Step S283, and displays information on the object.

Figure 29:
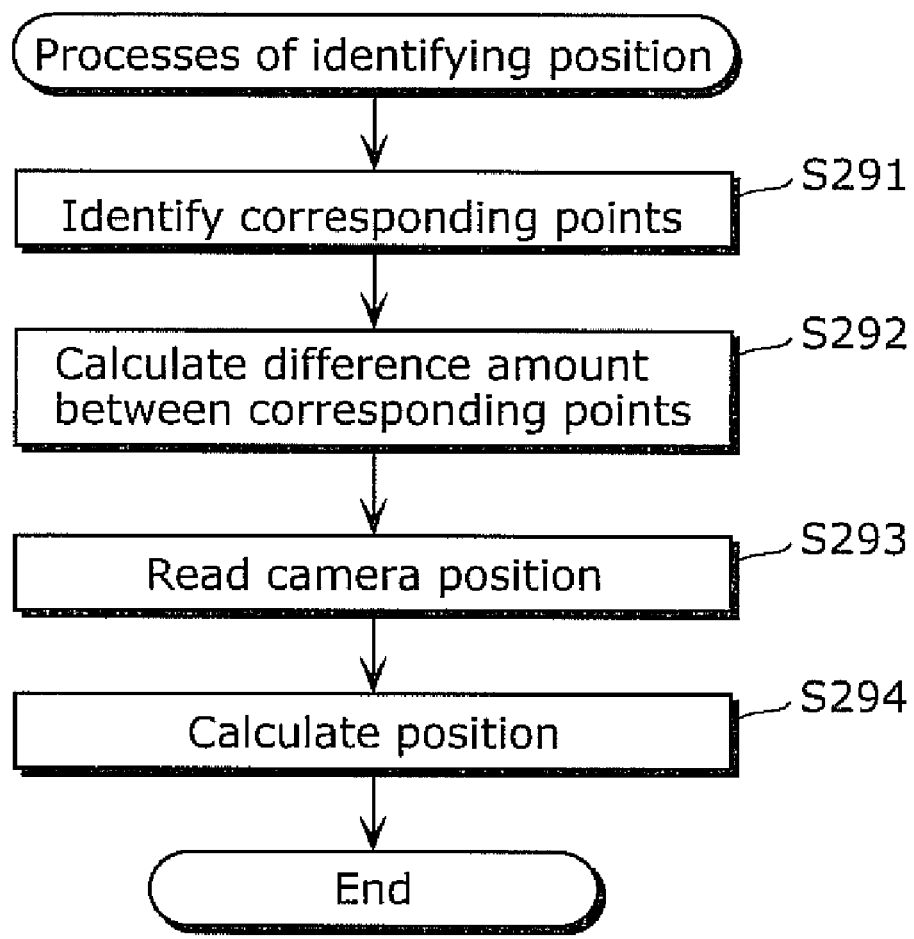
FIG. 29 illustrates a flowchart of processes for calculating a position of an item.

FIG. 29 shows a flowchart of processes for calculating a position of an item (for example, the object 401 in the blind spot or the own vehicle 301 in FIG. 5) included in each of the omni-directional images.

The blind spot display apparatus 1 and others perform, for example, the processes of Steps S291 to S294 in FIG. 29 to perform the processes of Steps S4 and S6 in FIG. 24 more specifically.

In Step S291, the blind spot display apparatus identifies points (the pixels P0 and P1 in FIG. 4, the blind spot corresponding points 505 and 506 in FIG. 6, the pixels P2 and P3 in FIG. 8) of images included in each of the omni-directional images.

The image in which an item is included may be made up of one pixel, and plural pixels, for example, plural pixels included in a square. The image may be, for example, all the pixels representing an object.

In Step S292, the blind spot display apparatus calculates a difference amount between the points identified in Step S 291 of the images including the image of the same object.

In Step S293, the blind spot display apparatus reads relational data for identifying correspondences including a correspondence between the difference amount calculated in Step S292 and the position of an object included in the images, from a predetermined memory.

Here, the memory may be, for example, the blind spot display apparatus itself, a predetermined memory included in the blind spot display apparatus, or another memory.

The read correspondences may include, for example, positions of omni-directional image generating units (for example, the omni-directional image generating units 100 in FIG. 1). Furthermore, the correspondences may include, for example, other appropriate data, such as the distance B in FIG. 7.

In Step S294, the blind spot display apparatus identifies a position associated with the difference amount calculated in Step S292 from the correspondences indicated in the relational data read in Step S293. Thereby, the blind spot display apparatus identifies the position of an item identified by the corresponding points obtained in Step S291.

More specifically, the blind spot display apparatus calculates the position of the object by the processes in FIG. 29. More specifically, the blind spot display apparatus calculates the position of the own vehicle 301 by the processes in FIG. 29.

More specifically, for example, the blind spot corresponding point search unit 103 and the own-vehicle corresponding point search unit 105 included in the blind spot display apparatus 1 and others perform the process in Step S291 of FIG. 29. Furthermore, for example, the blind spot position-coordinate calculating unit 104, the own vehicle position-coordinate calculating unit 106, and others perform the processes in Steps S292 to S294 in FIG. 29.

According to described Embodiments, the blind spot display apparatus (the blind spot display apparatus 1, the vehicle-side unit 1b of the blind spot display apparatus 1, the blind spot display apparatus 1A, and others) that is installed in a vehicle (the own vehicle 301) displays information on a blind spot that cannot be seen from the vehicle includes: an image storage unit (for example, the omni-directional image storage unit 102) configured to store captured images obtained at different positions; an object model generating unit (the blind spot model generating unit 109) configured to identify points of each image of an object based on the images of the object included in the captured images, and to calculate respective positions of the identified points at which the images of the object are included to obtain a position of the object; a vehicle model generating unit (the own-vehicle model generating unit 110) configured to identify points of each image of the vehicle based on the images of the vehicle included in the captured images, and to calculate respective positions of the identified points at which the images of the vehicle are included to obtain a position of the vehicle; a vehicle viewpoint-coordinate transforming unit (the own-vehicle viewpoint coordinate transforming unit 107) configured to transform the position of the object calculated by the object model generating unit into display coordinates relative to the position of the vehicle calculated by the vehicle model generating unit; and a display unit (display unit 108) configured to display information on the object using the display coordinates.

The blind spot display apparatus does not have to have two sets of captured images, that is, a set of captured images for calculating a position of an object and another set of captured images for calculating a position of an own vehicle. In other words, the position of an object and the position of an own vehicle can be simply calculated using only one set of captured images. Thereby, the configuration of the blind spot display apparatus can be simplified.

Furthermore, the blind spot display apparatus can be configured using captured images obtained by capturing devices that are easily available, such as capturing devices at administrative institutions. Thus, the blind spot display apparatus can be configured more easily.

The blind spot display apparatus may include a memory that stores correspondences between, for example, a point of each image of an item (the own vehicle 301, objects) in the images and a position of the item in the real world. Furthermore, the object model generating unit and others may calculate a position associated with each of the points in the stored correspondences, and identify the calculated position as the position of the item. The stored correspondences may include information, for example, positions, directions, and ranges in which the captured images are obtained.

In the blind spot display apparatus, for example, the object model generating unit includes: an object corresponding point search unit (the blind spot corresponding point search unit 103) configured to search two omni-directional images for two points corresponding to the object (see the blind spot corresponding points 505 and 506 in FIG. 6, and the pixels P0 and P1 in FIG. 4), and to determine the obtained two points as object corresponding points on the two omni-directional images (see Step S291 in FIG. 29); and an object position-coordinate calculating unit (the blind spot position-coordinate calculating unit 104) configured to calculate the position of the object, using a difference between two pixel positions determined as the object corresponding points (see Steps S292 and S294), and the vehicle model generating unit includes: a vehicle corresponding point search unit (the own-vehicle corresponding point search unit 105) configured to search the two omni-directional images for two points corresponding to the vehicle, and to determine the obtained two points as vehicle corresponding points on the two omni-directional images (see Step S291); and a vehicle position-coordinate calculating unit (the own vehicle position-coordinate calculating unit 106) configured to calculate the position of the vehicle, using a difference between two pixel positions determined as the vehicle corresponding points (see Steps S292 and S294).

Thereby, for example, the object model generating unit and the vehicle model generating unit may be similarly configured to each other. Thereby, for example, the configuration of the object model generating unit and the vehicle model generating unit may be simplified, for example, in combined use of a part of the functions of the object model generating unit with the functions of the vehicle model generating unit. Thus, the configuration of the blind spot display apparatus can be simplified.

Furthermore, the blind spot display apparatus 1 and others may include a determination unit that determines, for example, whether or not the object included in each of the images is an object in the blind spot. Furthermore, the blind spot display apparatus 1 and others may not include such a determination unit, and may display information on the object without determining whether or not the object is an object in the blind spot. When the object to be displayed is in a blind spot, consequently, the blind spot display apparatus 1 and others may display information on the object in the blind spot.

The present invention may be useful mainly as a safety support function and an alert function in an in-vehicle navigation system and a pedestrian navigation system. Furthermore, the present invention is useful as an application in which image processing is implemented by a program or as an LSI implemented by hardware.

The invention claimed is:

1. A blind spot display apparatus that displays an image of an object in a blind spot of a vehicle, said apparatus comprising:
 a storage unit configured to store omni-directional images which have been obtained from cameras at different positions and each of which includes the image of the object in the blind spot and an image of the vehicle;
 an object model generating unit operably coupled to the storage unit to calculate a coordinate position of the object seen from a predetermined camera among the cameras, using a difference between coordinate positions of the images of the object that are included in the omni-directional images;
 a vehicle model generating unit operably coupled to the storage unit to calculate a coordinate position of the vehicle seen from the predetermined camera, using a difference between coordinate positions of the images of the vehicle that are included in the omni-directional images; and
 a display unit operably coupled to the object model generating unit and the vehicle model generating unit to display the image of the object as seen from the vehicle on a display, using the calculated coordinate positions of the object and of the vehicle, the image of the object being included in common in each of the omni-directional images.

2. The blind spot display apparatus according to claim 1, wherein said vehicle model generating unit is configured to calculate the coordinate position of the vehicle seen from the predetermined camera, using a difference between a first point and a second point, the first point indicating the vehicle whose image is included in a predetermined one of the omni-directional images, and the second point (i) indicating the vehicle whose image is included in another one of the omni-directional images that is different from the predetermined one of the omni-directional images and (ii) corresponding to the first point.

3. The blind spot display apparatus according to claim 2, wherein said object model generating unit is configured to calculate the coordinate position of the object seen from the predetermined camera, using a difference between a first point and a second point, the first point indicating the object whose image is included in a predetermined one of the omni-directional images, and the second point (i) indicating the object whose image is included in another one of the omni-directional images that is different from the predetermined one of the omni-directional images and (ii) corresponding to the first point,
 the omni-directional images are images captured by the cameras installed at different positions at an intersection, the positions being adjacent to each other,
 the omni-directional images are omni-directional images with respect to the cameras that obtain the omni-directional images, respectively, and
 said blind spot display apparatus further comprises a selecting unit operably coupled to the storage unit to select two omni-directional images each of which is a captured image of the vehicle and the object, from the omni-directional images, and to provide the selected two omni-directional images to be used by said object model generating unit and said vehicle model generating unit.

4. The blind spot display apparatus according to claim 3, wherein said object model generating unit includes:
 a left blind spot corresponding point search unit configured to search for two corresponding points on images of an object in a left blind spot to a left of a traveling direction of the vehicle, and to determine the obtained two points as object corresponding points; and
 a right blind spot corresponding point search unit configured to search for two corresponding points on images of an object in a right blind spot to a right of the traveling direction of the vehicle, and to determine the obtained two points as object corresponding points.

5. The blind spot display apparatus according to claim 4, wherein the intersection is a cross intersection,
 each of the omni-directional images is made up of four quarter-size images corresponding to surrounding four quarter-size sections with respect to a corresponding one of the cameras that obtain the omni-directional images, and
 said selecting unit is configured to select, for said right blind spot corresponding point search unit, a corresponding one of the four quarter-size images that includes an image of a right blind spot at the intersection from one of the omni-directional images, and to select, for said left blind spot corresponding point search unit, a corresponding one of the four quarter-size images that includes an image of a left blind spot at the intersection from one of the omni-directional images.

6. The blind spot display apparatus according to claim 4, wherein the intersection is a cross intersection at which two roads intersect crosswise, the omni-directional images are four captured images respectively captured by four of the cameras installed at four corners formed by the intersecting two roads, and said selecting unit is configured to select, for said left blind spot corresponding point search unit, two of the cameras at two of the corners to a left of one of the roads to the intersection which the vehicle is to enter, when the object is in the left blind spot to a left of the vehicle with respect to the one of the roads to the intersection which the vehicle is to enter, and to select, for said right blind spot corresponding point search unit, two of the cameras at two of the corners to a right of one of the roads to the intersection which the vehicle is to enter, when the object is in the right blind spot to a right of the vehicle with respect to the one of the roads to the intersection which the vehicle is to enter.

7. The blind spot display apparatus according to claim 4, wherein said left blind spot corresponding point search unit is configured to perform a matching process on respective pixels of one of two perspective projection images from a left direction to a right direction of the pixels, with respect to the other one of the two perspective projection images that corresponds to one of the two omni-directional images captured at a position closer to the left blind spot, the two perspective projection images being transformed from the two omni-directional images selected by said selecting unit, and said right blind spot corresponding point search unit is configured to perform the matching process on the respective pixels of one of the two perspective projection images from the right direction to the left direction of the pixels, with respect to the other one of the two perspective projection that corresponds to one of the two omni-directional images captured at a position closer to the right blind spot, the two perspective projection images being transformed from the two omni-directional images selected by said selecting unit.

8. The blind spot display apparatus according to claim 3, wherein said selecting unit is configured to segment a corresponding one of the omni-directional images to be transferred into two or more predetermined areas that correspond to a shape of the intersection, and to transfer only one of the segmented areas.

9. The blind spot display apparatus according to claim 8, wherein said selecting unit is configured to transfer corresponding ones of the segmented areas that are different from each other and are in one of the omni-directional images to said object model generating unit and said vehicle model generating unit, said object model generating unit is configured to use the corresponding ones of the segmented areas transferred by said selecting unit to said object model generating unit, and said vehicle model generating unit is configured to use the corresponding ones of the segmented areas transferred by said selecting unit to said vehicle model generating unit.

10. The blind spot display apparatus according to claim 3, wherein the intersection is a cross intersection, each of the omni-directional images is made up of four quarter-size images corresponding to surrounding four quarter-size sections with respect to a corresponding one of the cameras that obtain the captured images, and said selecting unit is configured to select, for said vehicle model generating unit, a quarter-size image including the image of the vehicle from each of two of the omni-directional images.

11. The blind spot display apparatus according to claim 3, wherein said selecting unit is configured to search the omni-directional images for the images of the vehicle, and to select omni-directional images including a largest image and a second largest image of the vehicle that are obtained through the search, from among the omni-directional images including the images of the vehicle and the images of the blind spot.

12. The blind spot display apparatus according to claim 3, wherein said selecting unit is configured to determine a velocity of the object from corresponding ones of the omni-directional images obtained by one of the cameras, and to transfer each of the corresponding ones of the omni-directional images to said object model generating unit and said vehicle model generating unit only when the determined velocity is equal to or higher than a predetermined velocity.

13. The blind spot display apparatus according to claim 1, wherein said display unit is configured to display a predetermined pixel color corresponding to a value of a depth from the coordinate position of the vehicle calculated by said vehicle model generating unit to the coordinate position of the object calculated by said object model generating unit, as a color of the object on the display.

14. The blind spot display apparatus according to claim 1, further comprising:

a vehicle viewpoint image generating unit configured to capture an image seen from the vehicle; and a vehicle viewpoint-coordinate transforming unit configured to transform the coordinate position of the object calculated by said object model generating unit into display coordinates seen from the vehicle, wherein said display unit is operably coupled to the vehicle viewpoint image generating unit and the vehicle viewpoint-coordinate transforming unit to display the image captured by said vehicle viewpoint image generating unit, and to display the image of the object on the displayed image at a position of the display coordinates.

15. The blind spot display apparatus according to claim 14, wherein said display unit is configured to display, on the display, each pixel of the object in a pixel color obtained by semi-transparently superimposing a pixel color of each of the pixels of the image of the object on a pixel color of a corresponding pixel in the image captured by said vehicle viewpoint image generating unit.

16. The blind spot display apparatus according to claim 15, wherein said vehicle viewpoint-coordinate transforming unit is configured to transform each position determined by viewing a predetermined second view angle from the vehicle into display coordinates corresponding to a position in a first view angle at which said vehicle viewpoint image generating unit captures the image, the second view angle being wider than the first view angle, and said display unit is configured to display the image of the object at the second view angle in a range of the display coordinates corresponding to the position in the first view angle.

17. The blind spot display apparatus according to claim 15, wherein said display unit is configured to determine a size of the image of the vehicle in each of the omni-directional images, and to increase transparency of the display on which the object is shown as the determined size becomes smaller.

18. The blind spot display apparatus according to claim 1, wherein the omni-directional images are images captured by the cameras installed at positions at which both the image of the vehicle and an image of the blind spot that cannot be seen from the vehicle are captured, and each of said object model generating unit and said vehicle model generating unit is configured to obtain the omni-directional images transferred from an outside of said blind spot display apparatus to said blind spot display apparatus, and use the omni-directional images obtained.

19. A blind spot display method of displaying an image of an object in a blind spot of a vehicle, said method comprising:

storing omni-directional images which have been obtained from cameras at different positions and each of which includes the image of the object in the blind spot and an image of the vehicle;

calculating a coordinate position of the object seen from a predetermined camera among the cameras, using a difference between coordinate positions of the images of the object that are included in the omni-directional images;

calculating a coordinate position of the vehicle seen from the predetermined camera, using a difference between coordinate positions of the images of the vehicle that are included in the omni-directional images; and displaying the image of the object as seen from the vehicle on a display, using the calculated coordinate positions of the object and of the vehicle, the image of the object being included in common in each of the omni-directional images.

20. A computer program for displaying an image of an object in a blind spot of a vehicle using a computer, said computer program being recorded on a non-transitory computer-readable recording medium and causing the computer to execute:

storing omni-directional images which have been obtained from cameras at different positions and each of which includes the image of the object in the blind spot and an image of the vehicle;

calculating a coordinate position of the object seen from a predetermined camera among the cameras, using a difference between coordinate positions of the images of the object that are included in the omni-directional images;

calculating a coordinate position of the vehicle seen from the predetermined camera, using a difference between coordinate positions of the images of the vehicle that are included in the omni-directional images; and displaying the image of the object as seen from the vehicle on a display, using the calculated coordinate positions of the object and of the vehicle, the image of the object being included in common in each of the omni-directional images.

21. A non-transitory computer-readable recording medium on which the computer program according to claim 20 is recorded.

* * * * *